United States Patent
Khatibi et al.

(10) Patent No.: US 11,894,906 B2
(45) Date of Patent: Feb. 6, 2024

(54) BEAM GROUP SPECIFIC MOBILITY ROBUSTNESS OPTIMIZATION

(71) Applicant: Nokia Technologies Oy, Espoo (FI)

(72) Inventors: Sina Khatibi, Munich (DE); Ingo Viering, Munich (DE); Umur Karabulut, Munich (DE); Andreas Lobinger, Grafing (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/313,461

(22) Filed: May 6, 2021

(65) Prior Publication Data
US 2022/0360313 A1 Nov. 10, 2022

(51) Int. Cl.
| H04B 7/06 | (2006.01) |
| H04W 36/30 | (2009.01) |
| H04W 16/28 | (2009.01) |
| H04W 36/32 | (2009.01) |

(52) U.S. Cl.
CPC .......... *H04B 7/0695* (2013.01); *H04W 16/28* (2013.01); *H04W 36/305* (2018.08); *H04W 36/32* (2013.01)

(58) Field of Classification Search
CPC .. H04B 7/0695; H04W 16/28; H04W 36/305; H04W 36/32
See application file for complete search history.

(56) References Cited

U.S. PATENT DOCUMENTS

| 2019/0116506 A1* | 4/2019 | Bendlin ................. H04B 17/17 |
| 2020/0068462 A1* | 2/2020 | Zetterberg ........ H04W 36/0058 |
| 2020/0235800 A1* | 7/2020 | Tang .................... H04B 7/0695 |

(Continued)

FOREIGN PATENT DOCUMENTS

| CN | WO2021185259 A1 * | 9/2021 | ........ H04W 36/0069 |
| WO | WO-2019/245290 A1 | 12/2019 | |
| WO | WO-2020/156497 A1 | 8/2020 | |

OTHER PUBLICATIONS

ZTE Corporation, Sanechips "Consideration on RLF Report for MDT" 3GPP TSG-RAN WG2 Meeting #105bis, R2-1903469 Xi'an, China, Apr. 8-12, 2019.

(Continued)

*Primary Examiner* — Charles N Appiah
*Assistant Examiner* — Frank E Donado
(74) *Attorney, Agent, or Firm* — Joseph C. Drish; Harrington & Smith

(57) ABSTRACT

An apparatus including: at least one processor; and at least one non-transitory memory including computer program code, the at least one memory and the computer program code configured to, with the at least one processor, cause the apparatus to: associate communication beams into at least two different groups, where at least one of the groups has at least two of the communication beams; based upon beam-group specific key performance indicators, where the beam-group specific key performance indicators have been based upon the association of the communication beams into the at least two different groups, use the beam-group specific key performance indicators to determine at least one beam-group specific mobility parameter for at least one of the groups of communication beams; and transmit the at least one beam-group specific mobility parameters to a base station.

37 Claims, 14 Drawing Sheets

(56) References Cited

U.S. PATENT DOCUMENTS

| | | | |
|---|---|---|---|
| 2020/0314711 A1* | 10/2020 | Basu Mallick | H04W 36/00837 |
| 2021/0076227 A1* | 3/2021 | Martin | H04W 16/28 |
| 2021/0099942 A1* | 4/2021 | Tripathi | H04W 36/0033 |
| 2021/0175945 A1* | 6/2021 | Chen | H04W 24/08 |
| 2022/0103235 A1* | 3/2022 | Raghavan | H04B 7/088 |
| 2022/0141725 A1* | 5/2022 | Parichehrehteroujeni | H04W 36/0058 370/331 |

OTHER PUBLICATIONS

CMCC "Discussion on the RLF Report" 3GPP TSG-RAN WG2 Meeting #107 R2-1909762, Prague, Czech Republic, Aug. 26-30, 2019.

Ericsson "RLF Report Contents in NR" 3GPP TSG-RAN2 Meeting #107 R2-1910848, Prague, Czach Republic, Aug. 26-30, 2019.

ZTE Corporation, Sanechips "Discussion on RLF Report" 3GPP TSG-RAN WG2 Meeting #108, R2-1915420, Reno, NV, USA, Nov. 18-22, 2019.

Huang, Kuei-Li, et al., "An Enhanced MRO Method for Smart Antenna Capable (H)eNBs in LTE Networks", IEE Asia Pacific Conference on Wireless and Mobile (APWiMob), Aug. 2015, pp. 62-67.

* cited by examiner

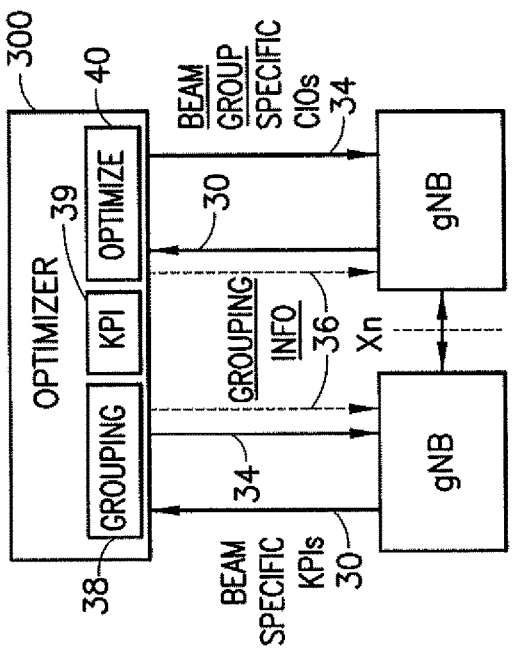
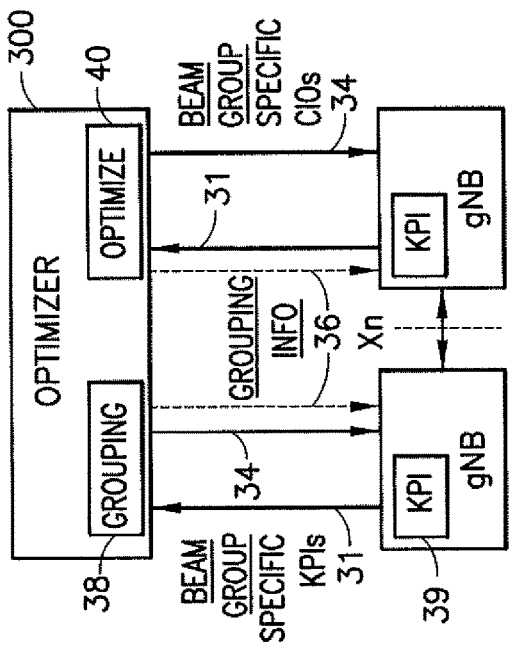
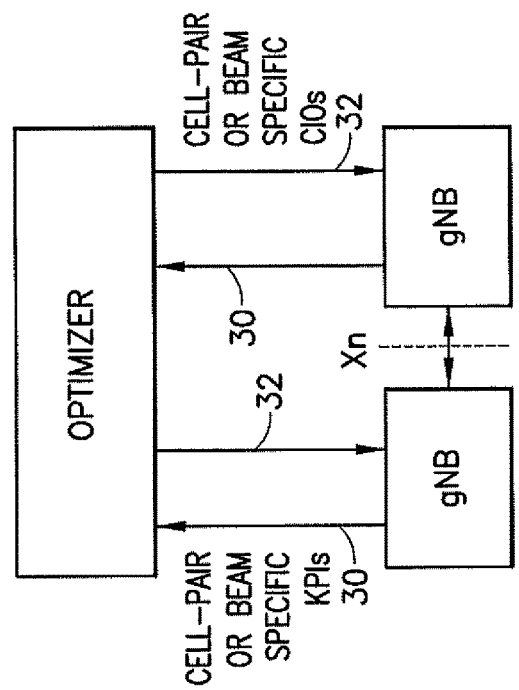
FIG. 8
FIG. 9
FIG. 7
PRIOR ART

BEAM GROUP SPECIFIC MOBILITY ROBUSTNESS OPTIMIZATION

BACKGROUND

Technical Field

The example and non-limiting embodiments relate generally to a communications and, more particularly, to a handover.

BRIEF DESCRIPTION OF PRIOR DEVELOPMENTS

U.S. Pat. No. 9,668,189 B2 discloses a handover management method relating to beams.

SUMMARY

The following summary is merely intended to be an example. The summary is not intended to limit the scope of the claims.

In accordance with one aspect, an example embodiment is provided in an apparatus comprising: at least one processor; and at least one non-transitory memory including computer program code, the at least one memory and the computer program code configured to, with the at least one processor, cause the apparatus to: associate communication beams into at least two different groups, where at least one of the groups has at least two of the communication beams; based upon beam-group specific key performance indicators, where the beam-group specific key performance indicators have been based upon the association of the communication beams into the at least two different groups, use the beam-group specific key performance indicators to determine at least one beam-group specific mobility parameters for at least one of the groups of communication beams; and transmit the at least one beam-group specific mobility parameters to a base station.

In accordance with another aspect, an example method is provided comprising: associating communication beams into at least two different groups, where at least one of the groups has at least two of the communication beams; based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams; and transmitting the at least one beam-group specific mobility parameter to a base station.

In accordance with another aspect, an example embodiment is provided in an apparatus comprising: at least one processor; and at least one non-transitory memory including computer program code, the at least one memory and the computer program code configured to, with the at least one processor, cause the apparatus to: based, at least partially, upon key performance indicators regarding communication beams, associate the communication beams into at least two different groups, where at least one of the groups has at least two of the communication beams; and based upon the association of the communication beams into the at least two different groups, generate grouping information, where the grouping information is configured to be used to generate beam-group specific key performance indicators.

In accordance with another aspect, an example method is provided comprising: based, at least partially, upon key performance indicators regarding communication beams, associating the communication beams into at least two different groups, where at least one of the groups has at least two of the communication beams; and based upon the associating of the communication beams into the at least two different groups, generate grouping information, where the grouping information is configured to be used to generate beam-group specific key performance indicators.

In accordance with another aspect, an example embodiment is provided in an apparatus comprising: at least one processor; and at least one non-transitory memory including computer program code, the at least one memory and the computer program code configured to, with the at least one processor, cause the apparatus to: based, at least partially, upon grouping information regarding communication beams, generate beam-group specific key performance indicators, where the grouping information comprises information regarding the communication beams having been grouped into at least two respective groups, where at least one of the groups comprises at least two of the communication beams; and based, at least partially, upon the generation of the beam-group specific key performance indicators, cause the beam-group specific key performance indicators to be sent, where the beam-group specific key performance indicators are configured to be used to create respective beam-group specific mobility parameters for use with initiation of a handover.

In accordance with another aspect, an example method is provided comprising: based, at least partially, upon a grouping information regarding communication beams, generating beam-group specific key performance indicators, where the grouping information comprises information regarding the communication beams having been grouped into at least two respective groups, where at least one of the groups comprises at least two of the communication beams; and based, at least partially, upon the generating of the beam-group specific key performance indicators, causing the beam-group specific key performance indicators to be sent, where the beam-group specific key performance indicators are configured to be used to create respective beam-group specific mobility parameters for use with initiation of a handover.

In accordance with another aspect, an example embodiment is provided in apparatus comprising: at least one processor; and at least one non-transitory memory including computer program code, the at least one memory and the computer program code configured to, with the at least one processor, cause the apparatus to: based, at least partially, upon beam-group specific key performance indicators, generate beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generation of the beam-group specific mobility parameters, at least partially cause at least one of the beam-group specific mobility parameters to be sent for subsequent use by a user equipment for sending a measurement report.

In accordance with another aspect, an example method may be provided comprising: based, at least partially, upon beam-group specific key performance indicators, generating beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generating of the beam-group specific mobility parameters, at least partially causing at least one of the beam-group specific mobility parameters to be sent for subsequent use by a user equipment for sending a measurement report.

In accordance with another aspect, an example embodiment may be provided in an apparatus comprising: at least one processor; and at least one non-transitory memory including computer program code, the at least one memory and the computer program code configured to, with the at least one processor, cause the apparatus to: receive information comprising grouping information; generate a plurality of beam-group specific key performance indicators based, at least partially, upon the received grouping information; transmit the plurality of beam-group specific key performance indicators to a network entity; receive information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially cause use of the first beam-group specific mobility parameter to perform a handover for a user equipment for sending of a measurement report to the apparatus.

In accordance with another aspect, an example method may be provided comprising: receiving information comprising grouping information; generating a plurality of beam-group specific key performance indicators based, at least partially, upon the received grouping information; transmitting the plurality of beam-group specific key performance indicators to a network entity; receiving information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially causing use of the first beam-group specific mobility parameter for sending of a measurement report to the apparatus.

BRIEF DESCRIPTION OF THE DRAWINGS

The foregoing aspects and other features are explained in the following description, taken in connection with the accompanying drawings, wherein:

FIG. 7 is a schematic diagram illustrating some communications between entities for conventional cell-based mobility robustness optimization and conventional beam-based mobility robustness optimization;

FIG. 8 is a schematic diagram illustrating features of one example of a beam-group-based mobility robustness optimization;

FIG. 9 is a schematic diagram illustrating features of another example of a beam-group-based mobility robustness optimization;

DETAILED DESCRIPTION OF EXAMPLE EMBODIMENTS

Figure 1:
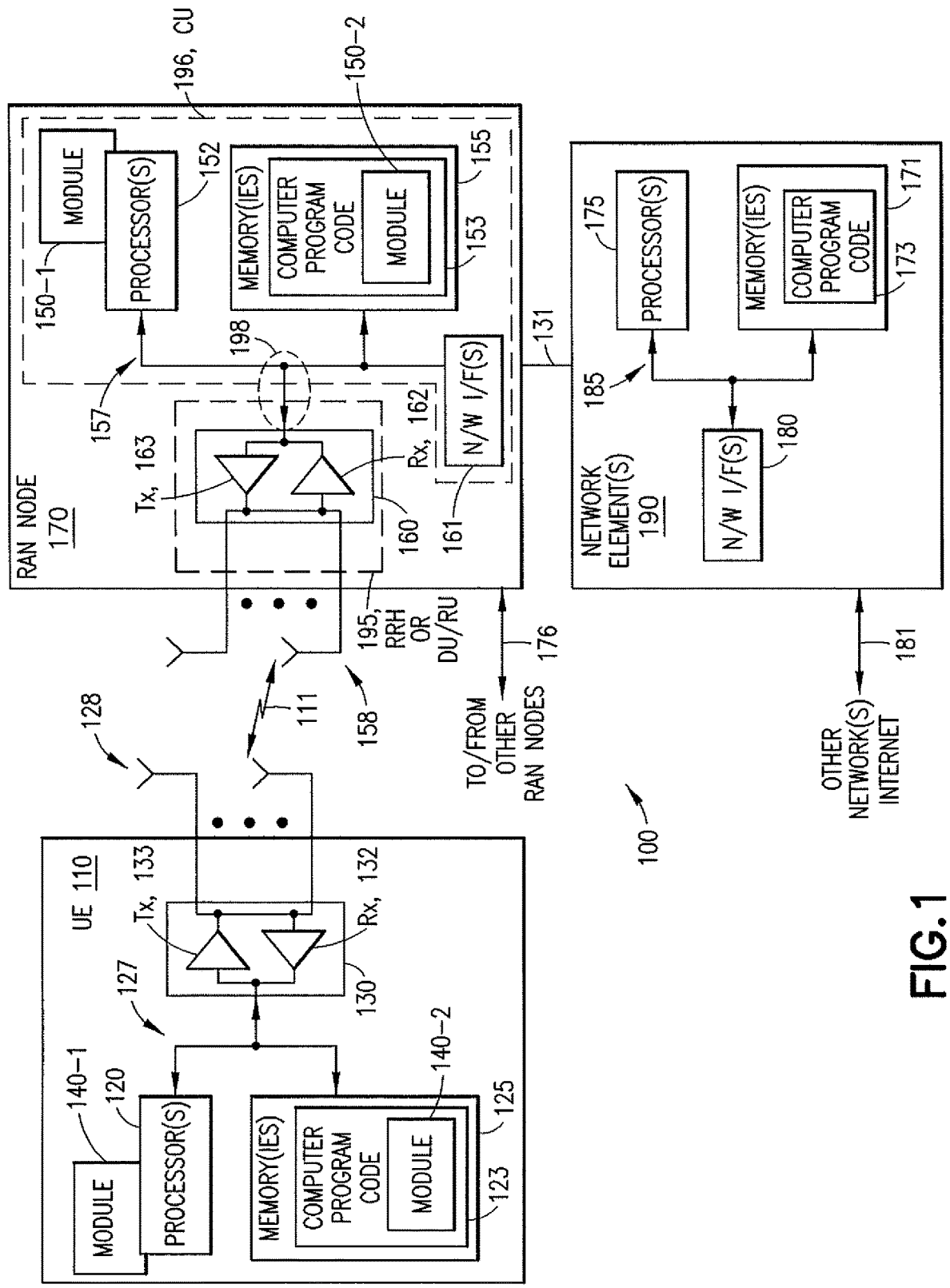
FIG. 1 is a block diagram of one possible and non-limiting example system in which features as described herein may be practiced.

The following abbreviations which may be found in the specification and/or the drawing figures are defined as follows:

3GPP third generation partnership project
5G fifth generation
5GC 5G core network
AMF access and mobility management function
BG Beam Group
BRF Beam Recovery Failure
CSI-RS Channel State Information Reference Signal
CIO Cell Individual Offset
CU central unit
DU Distributed unit
eNB (or eNodeB) evolved Node B (e.g., an LTE base station)
EN-DC E-UTRA-NR dual connectivity en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HO Handover
I/F interface
KPI Key Performance Indicator
LTE long term evolution
MAC medium access control
MME mobility management entity
Near RT RIC Near Real-Time RAN Intelligent Controller
ng or NG new generation
ng-eNB or NG-eNB new generation eNB
NMS Network Management System
MRO Mobility Robustness Optimization
NR new radio
N/W or NW network
OAM Operation, Administration, and Management
O-RAN Open Radio Access Network
PDCCH Physical Downlink Control Channel
PDCP packet data convergence protocol
PDSCH Physical Downlink Shared Channel
PHY physical layer
RAN radio access network
Rel release
RIC RAN Intelligent Controller
RLC radio link control
RLF Radio Link Failure
RRH remote radio head
RRC radio resource control
RU radio unit
Rx receiver
SDAP service data adaptation protocol
SGW serving gateway
SMF session management function
SSB Synchronization Signal Block
TE Too-Early
TL Too-Late
TS technical specification
TTT Time to Trigger
Tx transmitter
UE user equipment (e.g., a wireless, typically mobile device)
UPF user plane function
WC Wrong Cell Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
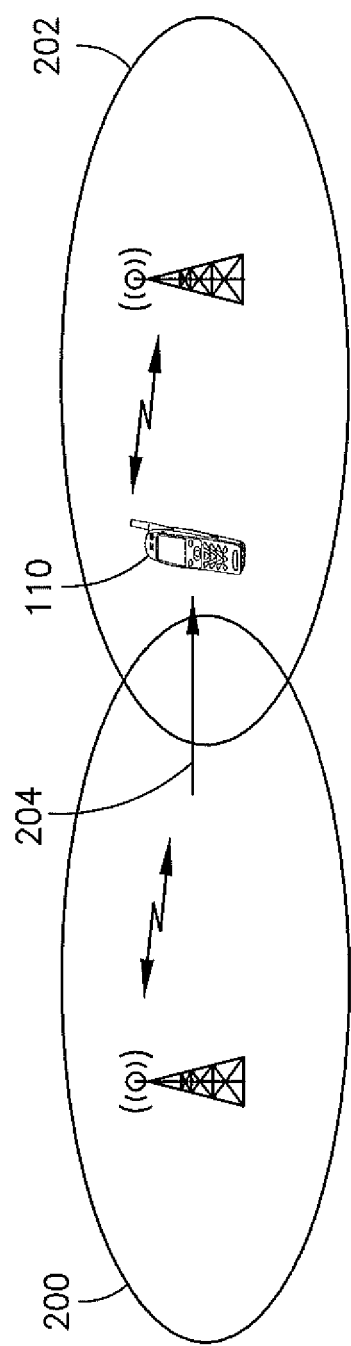
FIG. 2 is a diagram illustrating an example of a User Equipment (UE) which is traversing partially overlapping cells.

Referring also to FIG. 2, a UE 110 is shown along with two cells 200, 202. As illustrated by arrow 204, the UE 110 may move between the cells 200, 204. A handover (HO) may occur when this happens. The handover may transfer an ongoing call or data session when the UE 110 moves between cells 200, 202. The general concept of a handover is well known and keeps a call or/and data session connected even if a user of the UE 110 moves from one cell to another. Different types of cells are known including, for example, PCells, SCells and satellite cells.

Features as described herein generally relate to Mobility Robustness Optimization (MRO) issues in cellular mobile communications. MRO is a method for optimizing mobility parameters and minimizing mobility related failures and unnecessary handovers. As described below, features as described herein may comprise signaling beam-specific cell individual offsets (bCIOs) to the UE in a single reconfiguration, and the UE may autonomously select a corresponding beam specific cell individual offset when the UE is switched to another beam. This may be used to save or reduce a lot of signaling, and delay switching the beams (by avoiding the RRC involvement). The signaling of the beam-specific cell individual offsets (bCIOs) to the UE in a single reconfiguration may comprise signaling all the beam-specific cell individual offsets (bCIOs) to the UE in the single reconfiguration. Features as described herein may be used for mobility robustness optimization (MRO) of cellular mobile communications and optimizes the key mobility parameter settings (values for e.g., Cell Individual Offset CIO, Time-to-Trigger TTT) of MRO algorithm in order to better control the handover procedure initiation.

Conventionally, a common approach in MRO algorithms is to optimize parameters in controlling the handover procedure initiation, such as the Cell Individual Offset (CIO) and Time-to-Triger (TTT). The network can control the handover procedure for any cell-pair in the network by defining different CIO and TTT values for them. The value of CIO and TTT is highly dependent on the speed of the UE/terminal crossing through the cell-pair boundary. Faster terminals start the handover procedure much sooner. This goal is achieved by either increasing the CIO (i.e. the offset between the measured signal power of serving cell and the target cell) or decreasing the TTT (i.e. the interval, during which the trigger requirement is fulfilled). In contrast, the cell boundaries dominant with the slow terminal crossing, the handover procedures may be started relatively later by choosing the lower values for the CIO or higher TTT. It is worth noting that changing the CIOs rather than TTTs are the preferred approach in practice.

Figure 3:
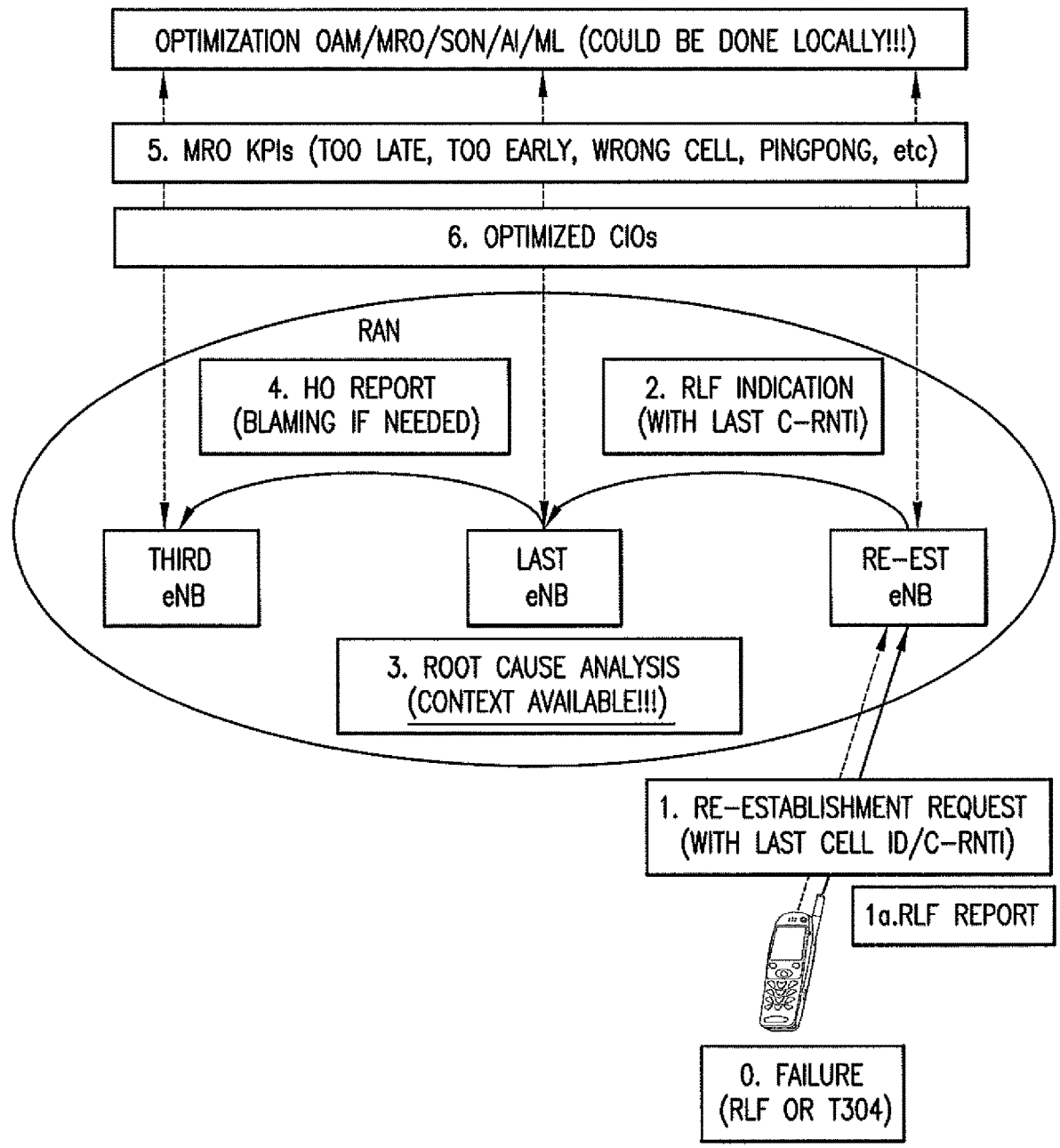
FIG. 3 is a schematic diagram illustrating a conventional mobility robustness optimization procedure.

FIG. 3 illustrates a conventional Mobility Robustness Optimization. At step 0, a UE may suffer a connection failure such as, for example, a radio link failure (RLF) or a handover failure (expiry of the timer T304). As illustrated by step 1, the UE will start connection re-establishment request to a new cell/eNB ("Re-est eNB"), which already contains the physical cell identifier (PCI) of the previous connected cell and the previous UE identifier (C-RNTI) in the previous cell. Optionally, the new eNB may also request an RLF Report, if the re-establishment is successful. As illustrated by step 2, the new eNB may send an RLF Indication (containing the RLF report, if received) to the previous cell ("last eNB") via a X2/Xn interface, which is determined from the PCI in the re-establishment request. As illustrated by step 3, the last eNB usually still has the UE context and can identify it by help of the C-RNTI. Thus, the eNB has all the necessary information to identify the root cause of the failure such as, for example, too-early handover, too-late handover, handover to wrong cell. Note that this root cause evaluation in the gNBs is the major intelligence in the MRO algorithm; not necessarily the optimization in step 6. As illustrated by step 4, optionally, if the last eNB identifies that it was not the "guilty" eNB (e.g. since there was a successful handover too shortly beforehand), it may blame another eNB ("third eNB") by sending a "HO Report". As illustrated by step 5, the last eNB may count the evaluated root causes as KPIs, and report them regularly (e.g. every 24 hours) to a central entity, e.g. OAM, RAN Intelligent Controller, AI/ML entity. As illustrated by step 6, based on these KPIs, the central entity will run an optimization of mobility parameters, e.g. CIO. For example, if, for a specific cell-boundary, much more too-late than too-early handovers are reported, the optimization would increase the corresponding CIO to force earlier handovers for future UEs. These optimized parameters are then fed back to the eNBs (such that they can configure future UEs with the more optimized parameters). Note, that the optimization could also be done inside the eNBs. However, many implementations are using the centralized option to have a better monitoring of the parameters (operators are reluctant to give the control on relevant parameters to eNBs).

The MRO for the cell-pair boundaries with combination of slow and fast terminal is challenging since choosing handover parameters (CIO or TTT) based on any of those speed groups may lead to mobility failure (e.g. Too-Late (TL), Too-Early (TE), or Ping-Pong handover) of the other group. Hence, as described herein, a feature may be used to apply a technique to group the users and chose the mobility parameters for each group independently. By utilization of beamforming in the 5G NR, it is possible to increase granularity of the boundaries from cell-pair to beam-cell pair. Hence, the terminals based on their serving beams can be divided into smaller group, for which different handover parameters (i.e. CIO and TTT) can be set. In other words, in the beam-based MRO the network may:

Set up beam-specific handover statics,
Optimize different CIO/TTT for different beam-cell pairs,
Configure different CIO/TTTs depending on the beams, in which the UE is moving.

U.S. Pat. No. 9,668,189 B2 teaches the basics of beam-specific MRO in a sense that the network creates beam specific Key Performance Indicators (KPIs) and derives beam specific CIOs. The UE is not involved. This implies that the network must reconfigure the UE with a new CIO whenever the UE is switched to a new beam. Note that CIO is configured by Radio Resource Control (RRC), whereas beam switching is a much more slim Media Access Control (MAC) procedure. RRC involvement into beam switching was avoided by intention, so CIO updates would counteract this original purpose. Furthermore, the network must make its evaluation with existing information.

Optimizing the HO parameters on the cell-level may suffer from fast-slow HOs deadlock, on one hand. On the other hand, the beam-based MRO also has shown to be too granular for most MRO uses cases, which:

Makes the optimization problem more complex,
Extremely reduces the convergence rate (i.e. it takes longer until the optimization converges due to less observations/events per beam),
Beam-based MRO requires either huge signaling overhead when HO parameters are signaled via RRC with every beam change, or larger list/table for HO parameters to be transferred to UE.

Figure 4A:
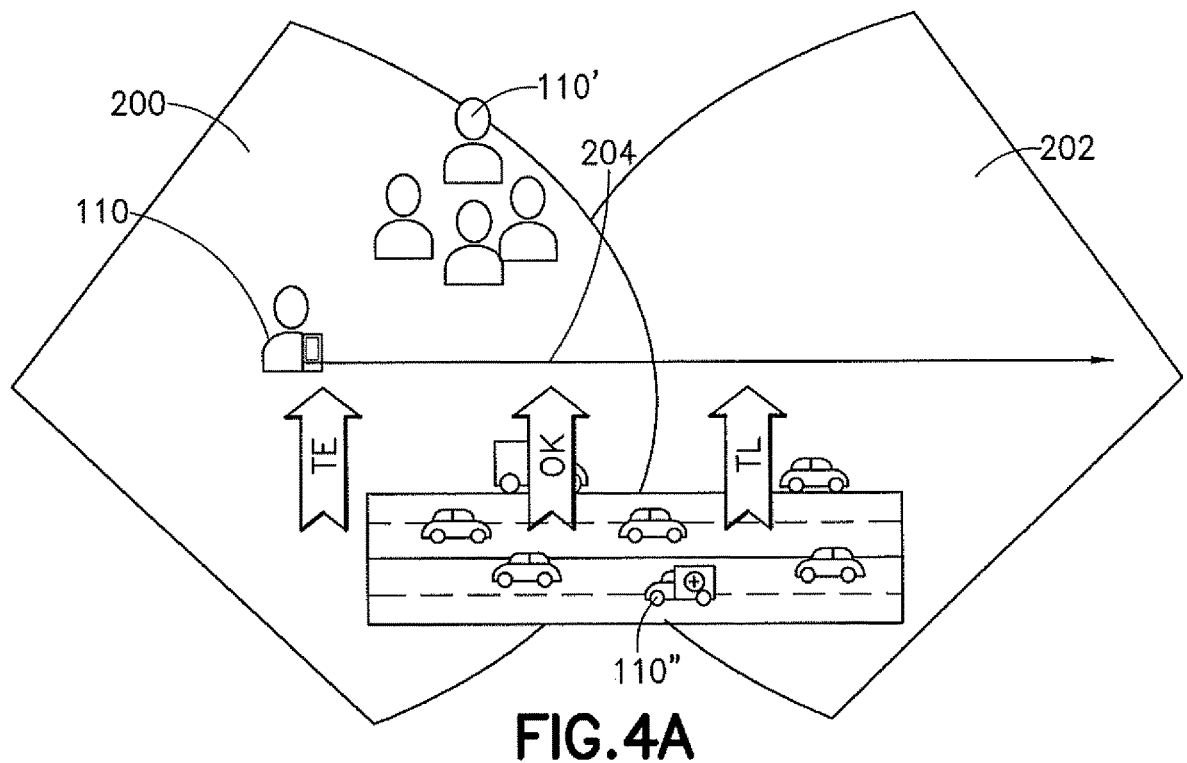
FIG. 4A is a schematic diagram illustrating features regarding a cell-based mobility robustness optimization.
Figure 4B:
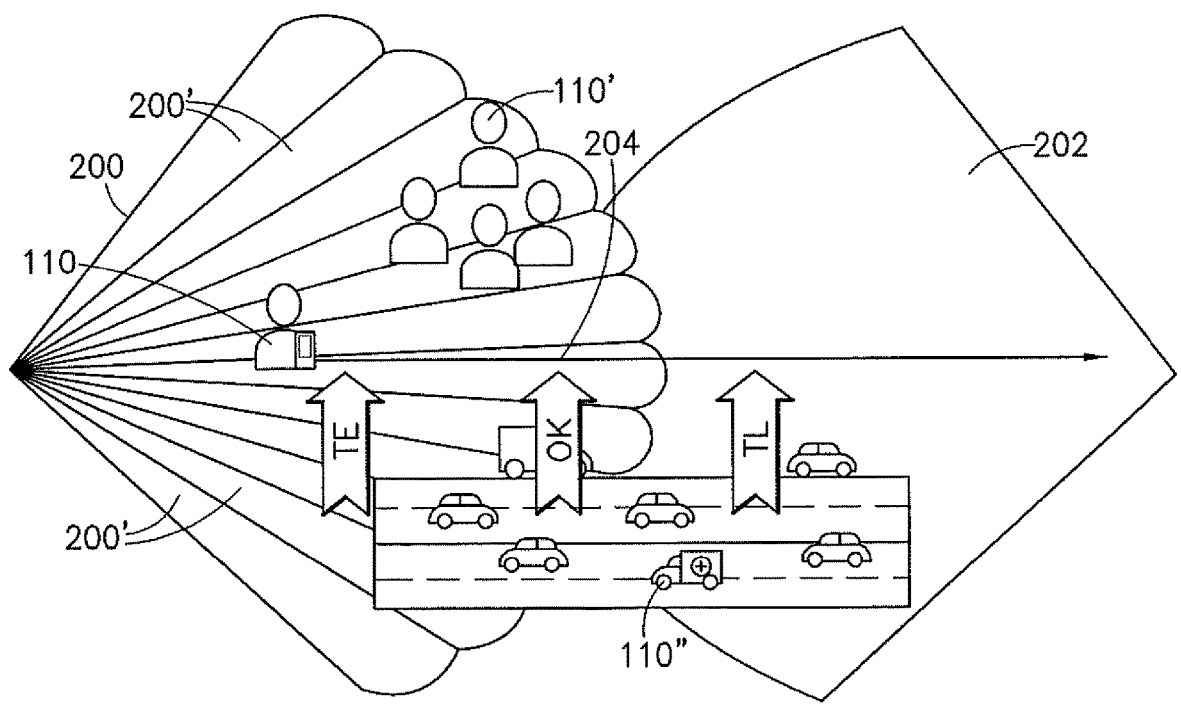
FIG. 4B is a schematic diagram illustrating features regarding a beam-based mobility robustness optimization.
Figure 5B:
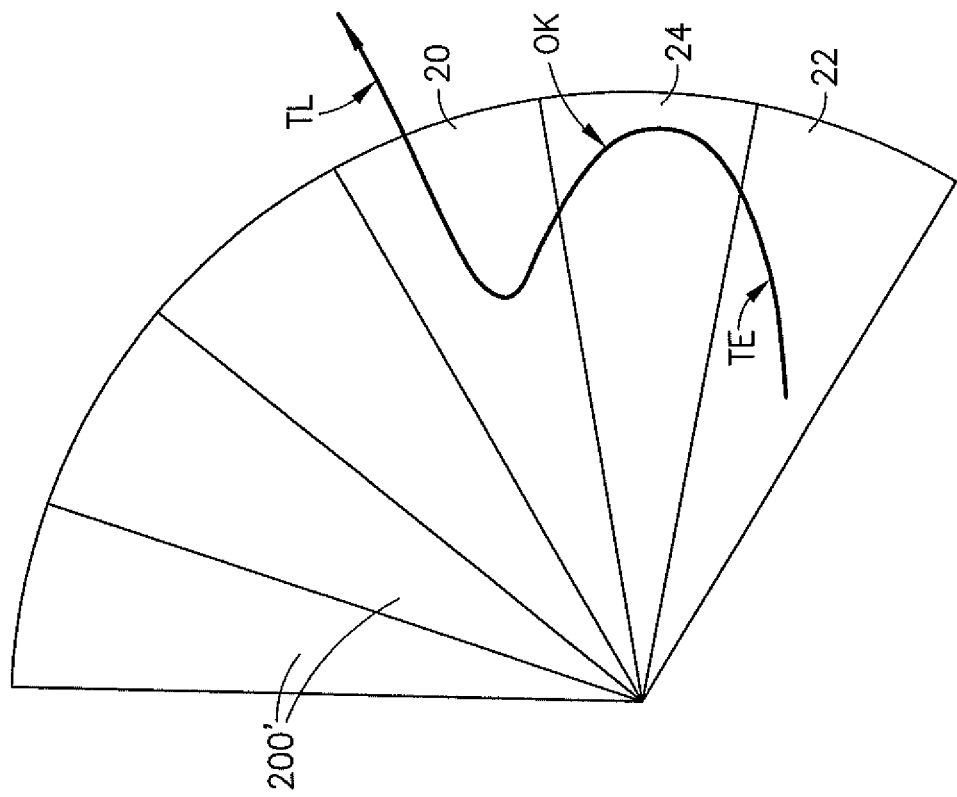
FIG. 5B is a schematic diagram illustrating too-late, too-early and successful handover regarding a beam-based mobility robustness optimization.
Figure 5A:
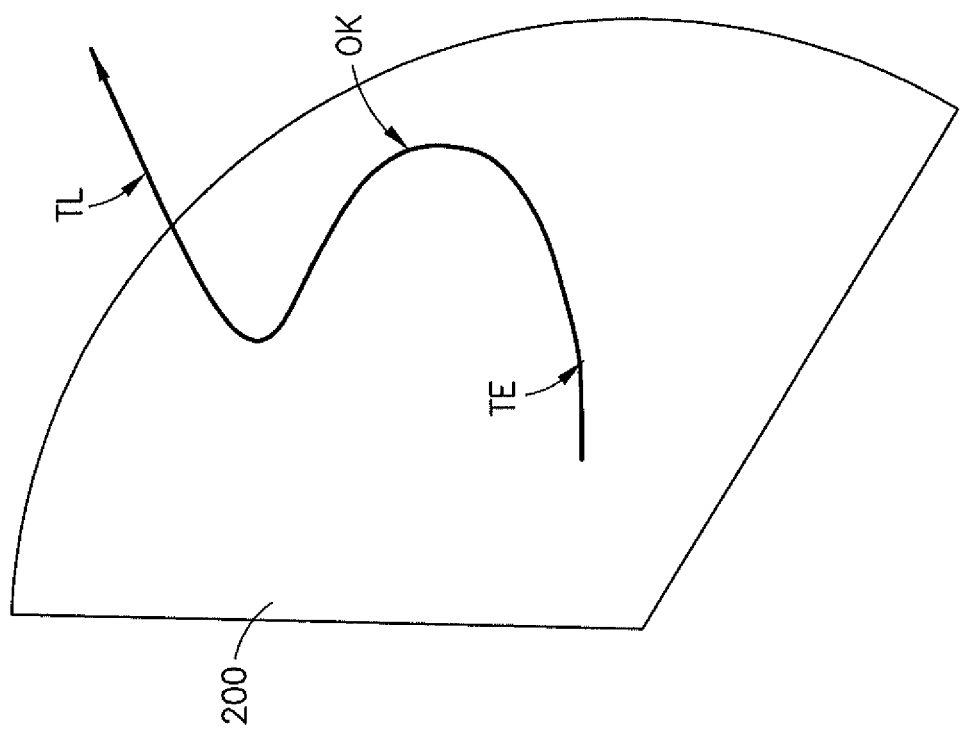
FIG. 5A is a schematic diagram illustrating too-late, too-early and successful handover regarding a cell-based mobility robustness optimization.

Referring also to FIG. 4A, an illustration symbolizing cell-based MRO is shown. FIG. 4A shows a portion of the cell 200 and a portion of the cell 202 with UE 110, arrow 204 and illustrating that the UE 110 may be relatively slow moving 110' (such as with people walking for example) or relatively fast moving 110" (such as in vehicles on a road for example). FIG. 4A also illustrates where during the travel 204 between the cells 200, 202 the handover would be considered too-early (TE), acceptable (OK) and too-late (TL). Referring also to FIG. 4B, an illustration symbolizing beam-based MRO is shown. As seen in FIG. 4B, the cell 200 is considered in regard to its multiple communication beams 200'. Both figures illustrate faster moving UEs, such as in vehicles moving on a road, shown at the bottom of each figure, and slower moving UEs, such as people walking, shown at the top of each figure. Currently, the MRO and handover parameters are considered in cell-based format. Regarding FIG. 4B and beam-based mobility, the guilty beam is not always the last beam connected, or the beam that the entering condition applied (as it was assumed in the prior art). For instance, referring to FIG. 5A for a cell-based MRO and FIG. 5B for a beam-based MRO, for the beam-based MRO the too-late (TL) failure may happen when the UE is connected to the beam 20. However, changing the beam 20 parameter may not necessarily resolve the failure, since handover can only be started once the UE switches to the beam 20. Starting the handover (HO) from beam 22 leads to a too-early (TE) failure. On the ground of these observations, it is apparent the proper time to enter condition is when the UE is somewhere between the beams 24, 20 (or near their boundary). Given the unpredictable nature of the channel, some level of uncertainty may always remain to find the responsible beam.

From simulations, we have seen that beam switches happen shortly before handover (or shortly before a failure) or during TTT often, and it is not a corner case. Especially if many beams are utilized (e.g. 64 beams in Frequency Range 2) and/or relative angular speeds of the UEs are higher, a moving UE may not stay long in a single beam.

Features as described herein may comprise decreasing the spatial granularity of MRO from beam-level to a beam-group-level. For example, FIG. 4B shows twelve beams 200'. With features as described herein, two or more of the beams 200' may be grouped together for decreasing the spatial granularity of MRO from beam-level (twelve beams in this example) to a lesser number (such as less than twelve in this example). For purposes of description herein, beam-level KPIs (for individual ones of the beams 200') are referred to as beam specific KPIs, and beam-group-level KPIs (having a group of one or more beams) are referred to as beam-group specific KPIs. Decreasing the spatial granularity of MRO to a beam-group-level with beam-group specific level KPIs can be used such that the process will not only decrease complexity, but may even increase the performance. Although beams are well-defined such as via SSBs or CSI-RS, beam groups are currently not defined in 3GPP specifications. Therefore, features as described herein will impact some network interfaces, but it may not need any changes on the air interface and, thus, would work for legacy UEs. The beam-group based MRO may be split into different functionalities, and may all reside either inside the base station (such as a gNB for example), or outside in a network or central entity (such as in OAM/Operation and Maintenance, RIC/RAN Intelligent controller in ORAN, AI/ML entity, etc.), and might not necessarily be in the same entity. The functionalities may comprise, for example:

Beam grouping (beams may be summarized into reasonable beam groups)

Group specific KPIs or beam-group specific KPIs (gNBs may generate beam-group specific KPIs)

Optimization (of e.g. CIO): Finally, the optimization may be done per beam group Configuration of UEs (e.g. CIO): a major advantage is that legacy signaling can be used, but improvements are also possible.

Features as described herein may be used to provide a MRO method which optimizes mobility parameters based on information obtained in a network. This may comprise beam grouping, group specific KPIs, group specific CIO optimization, and signaling to UE. For beam grouping, a plurality of beams may be grouped into groups of beams (each group comprising at least one beam, and groups of more than one beam are possible). The method may generate beam-group specific KPIs. The method may provide beam-group-specific CIO optimization with assigning an individual group mobility parameter to each of the groups based on the group specific KPIs. For signaling to the UE, the UEs may be configured such that they will use an individual group parameter when being connected to a beam that is member of the group.

Beam grouping may be done in a central entity (such as OAM, RIC, AI/ML for example) or in gNBs. The beam grouping may be based on at least one of: geographical data, beam resolved information (such as beam-specific MRO KPIs for example), or based on previous beam-group specific KPIs.

Group specific KPIs may be generated in a central entity (such as OAM, RIC, AI/ML for example) or in gNBs (not necessarily in the same entity as the grouping). Grouping specific KPIs may be at least partially based on the grouping information (group definition) from the grouping entity and at least partially based on information from failure or handover events received from UEs (RLF Report, Successful Handover Report) or from gNBs (RLF indication, traces). The group specific KPIs may be, for example, group specific: too-late handover, too-early handover, handover to wrong cell, ping-pong, shortstay.

CIO optimization may be done in a central entity (such as OAM, RIC, AI/ML for example) or in gNBs (not necessarily in the same entity as the grouping or KPI generation). The CIO optimization may be similar to conventional cell-pair specific MRO or beam specific MRO.

For the signaling to UE, conventional RRC signaling of CIO from the gNB to UE may be used, when the UE is switched to a beam which is member of another group than the previous one, where the gNB received the mobility group parameters (CIOs) from the optimization entity, and where the gNB received the group information (group definition) from the grouping entity or KPI generating entity. Alternatively, the UE may be provided with all mobility group parameters and group definition, and may autonomously select the correct mobility group parameter.

Different examples of implementation options are described below. Differences among the options are generally in regard to the exact location, where the "grouping", the "KPI generation" and the "optimization" reside. As noted above, conventionally, gNBs mutually exchange information via Xn (e.g. RLF Indication as specified in 38.423), in order to generate KPIs, e.g. "too-early handover", "too-late handover", "handover to wrong cell" and "ping-pong handover" as specified in 28.522. These KPIs are defined per cell-pair. There has also been proposed to define these KPIs in a beam-specific way. Although cell/cell-pair and beams are already defined in the specifications, beam groups are not defined in the specification.

As shown with reference to FIG. 7, with a conventional individual beam-specific MRO or cell-pair MRO these KPIs 30 may be acquired by an optimizer, which is a function or a service implemented either inside the gNBs, or outside in more central network entities (such as a OAM/Operation and Maintenance, RIC/RAN intelligent controller, AI/ML entity for example). The optimizer uses the KPIs to optimize certain parameters such as the Cell Individual Offset 32 for every cell-pair, or even individually for every beam. The information exchange between the gNBs and the optimizer may be realized as:

Internal interface

E2 interface defined in the ORAN specifications

O1 interface defined in ONAP

Itf-N interface defined in the LTE specification

NR is using the principles of a service based architecture, where the request/response procedures are defined in e.g. 28.623/28.622 (e.g. Corba IDL, XML, YANG, YAML)

Figure 6:
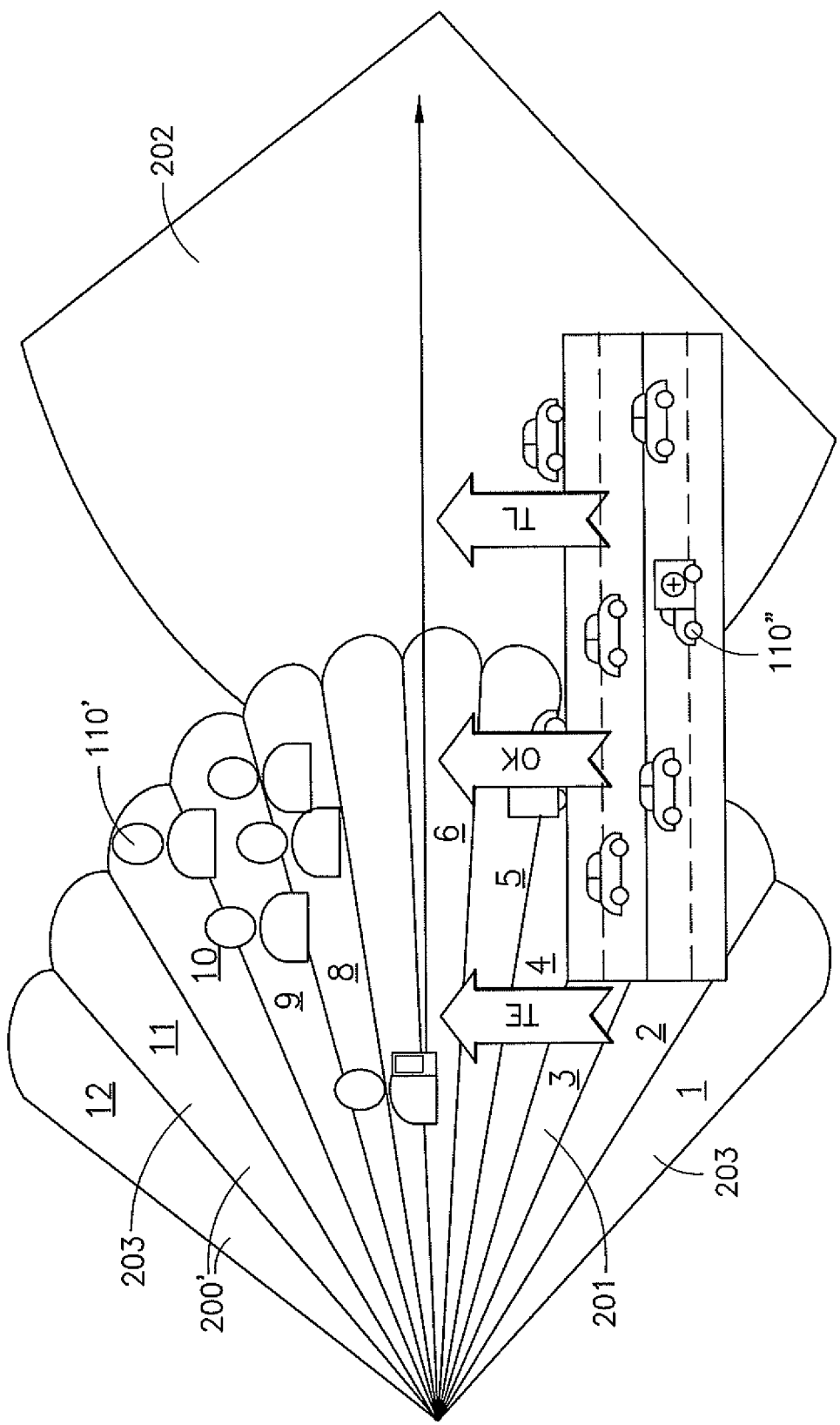
FIG. 6 is a schematic diagram illustrating features regarding a beam-based mobility robustness optimization.

In the following description, we will assume "monolithic" gNBs, where the central unit and the distributed unit are implemented in the same physical entity without F1 interface. Referring also to FIG. 6, which is similar to FIG. 4B, but with individual beams 200' numbered 1-12, recall, that on the same cell boundary we have fast UEs 110" in a street (which is originated in beam 2, 3 and 4, and pedestrians 110' which may be in all the other beams 1 and 5-12; concentrated in beams 8, 9 and 10. As noted above, conventional beam-specific MRO is quite complex and leads to ambiguities when determining whether beam 2, 3 or 4 has bad parameter settings, if failures happen shortly after beam switch. So with features as described herein, a method may be used to make multiple beam groups (at least two beam groups). In one example, referring to FIG. 6, two beam groups are formed; one beam group 203 covering the street beams 2,3 and 4, and the other beam group 201 covering all the other beams. This may provide a dominant gain with much less complexity and in a much more robust way compared with individual beam-specific MRO.

Referring to FIG. 8, in a first example the grouping, the beam-group KPIs for the groups 201 and 203 and the optimization are all done in the centralized entity 300. The centralized entity 300 is initially fed with beam-specific KPIs 30 similar to that shown in FIGS. 7 and 4B. Based on these, the optimizer 40 can identify similar behavior in different beams 200', and can summarize beams with similar KPIs into groups; in this example into the two groups 201 and 203. Beam-group specific KPIs 34 may be generated by simply aggregating the beam specific KPIs from the gNB for example. The optimization may be done on the groups just as it is done today for beams or cell pairs. The beam-group specific parameters (e.g. CIO) 34 may be given back to the gNBs. However, the optimizer may also be provided the grouping information 36, i.e. which beams belong to which group (or which parameter is valid for which beams). Thus, the optimizer of the centralized entity 300 may group beams 38, generate beam-group specific KPIs 39 and perform optimization 40 which is then signaled to the network nodes.

The network element "the optimizer" is actually more like a management entity, and it may be coupled via management interfaces, such as Itf-S and Itf-N in LTE for example. In NR, this interface does not have a previous specific name since it is more of a service based architecture. Another example is that the network element is RIC (RAN Intelligent Controller) in the ORAN Architecture, and the interface would then be called E2. We are actually not talking about AMF and S1/NG Interface here, but it is an example. Similarly, the Network Element is also not necessarily connecting to "Other Network(s)/Internet" as shown in FIG. 1.

The example shown in FIG. 8 has little impact on the network interfaces and may be vendor-specific. The grouping may be transparent to the gNBs, when the optimizer provides beam-specific parameter values (whereas values in the same beam group may be identical). However, the example may still suffer high complexity from the beam-specific KPI generation and uncertainties from the root cause evaluation. Since the gNB already has the grouping information, it will also understand the group specific parameters sent by the optimizer.

Referring also to FIG. 9, another example is shown. Features described with reference to this example may also be applied to one or more of the other examples. In this example, the gNBs may generate the beam-group specific KPIs based on grouping information 36 provided by the optimizer of the centralized entity 300. This may provide significant complexity reduction benefits to the KPI generation and the root cause evaluation, and it may also make the KPIs more robust (since identifying a suboptimal beam GROUP parameter is much simpler than identifying a suboptimal beam parameter).

The grouping 38 in the optimizer may be done based on beam-group specific KPIs 31 provided by the gNBs, on geographical information, on previous optimization cycles, and/or on any other information available in the optimizer. For example, the following rules can be applied to adapt/modify/optimize 40 the group allocations):

The method may be initialized with beam specific MRO (i.e. every beam is a group), or with cell-pair specific MRO (all beams form a single group).

Beam groups with similar behaviour/similar KPIs may be summarized/combined to a bigger group.

If contradicting KPIs are detected in a group, a group may be split into two or more smaller groups Contradicting KPIs could mean, for instance, that one beam group reports too-late handovers along with ping-pongs/too-early handovers which makes a further optimization impossible. In the example in FIG. 6, when initially all beams are in a single beam group (cell-pair specific), the KPIs would show a conflict between too-late handovers produced by the street users, and the ping-pongs produced by the pedestrians.

The exact split (how many smaller groups with which beams) may be determined based on geographic data (e.g. beams covering streets can be separated from others beams in the same group). In FIG. 6 it may not be too complicated to assign the street to beams 2, 3 and 4 (expecting a different behaviour in the street). Even if this splitting is not 100% ideal, there still may be significant benefits from splitting. These beams may be spun off into a separate group.

For better identification of the split, the optimizer may temporarily request beam specific KPIs from the gNBs such as, for example, for limited time and limited beam groups there could be a fall-back to the first option/example described above in FIG. 8.

Resetting the parameters to a default might be helpful when changing the group definition (combining/splitting beam groups). Alternatively, the parameter from a predecessor group may be inherited for a new group.

Figure 10:
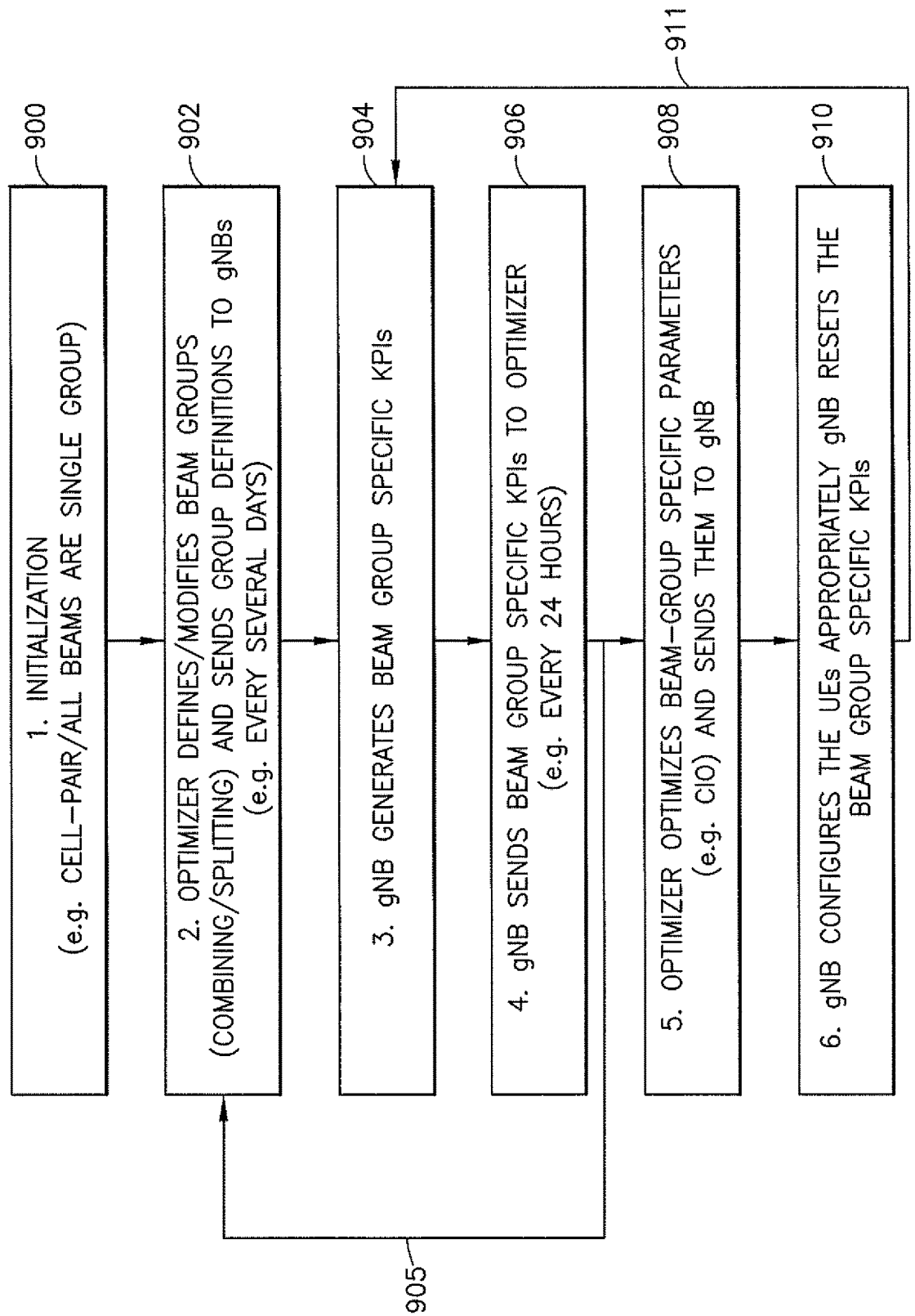
FIG. 10 is a diagram illustrating an example method.

Referring also to FIG. 10, as indicated by block 900 the method may initialize with either cell-pair specific MRO (i.e. all beams in a cell are a single group) with non-beam-group specific KPIs such as illustrated with FIGS. 4A and 7, or with beam specific MRO (i.e. each beam is a single group) with non-beam-group specific KPIs such as illustrated with FIGS. 4B and 7. As indicated by block 902, the optimizer 300 may then use the non-beam-group specific KPIs to define beam groups. The optimizer 300 may subsequently also modify prior defined beam groups as further understood below and may regularly revisit the group definition and modify if needed. This can be done by internal information (such as geographical data for example), or based on input received from the gNBs. This group modification process may be done on a slower time scale than the usual MRO optimization such as, for example, every several days. MRO optimization may be done at a faster time scale, such as every 24 hours for example, or every 24 hours when MRO optimization is done every 10 minutes to 1 hour for example. When the group definition is adapted (initially defined or subsequently redefined), the new group definitions may be sent to the gNB.

As indicated by block 904, based on these group definitions, the gNB may continuously generate beam-group specific KPIs 31 such as, for example, beam-group specific "too-late handovers", beam-group specific "too-early handovers", and so on. These KPIs may be generated by evaluating the root cause of radio link failures or of handover failures of UEs which have been configured with beam-group-specific parameters. As indicated by block 906, the gNB collects/counts these beam-group specific KPIs and sends them to the optimizer as illustrated by 905 such as, for example, after about 24 hours, or after about 10 minutes-1 hour, or whenever a sufficient number of events have been evaluated. As indicated by block 908, based on these beam-group specific KPIs 31, the optimizer 300 may perform the final optimization of the beam-group specific parameters, such as the beam-group specific cell individual offsets for example. This may follow well known principles such as, for example, if the number of beam-group specific "too-late handovers" is much larger than the number of beam-group specific "too-early handovers", the beam-group specific CIO is increase, such as by 1 dB for example. These beam-group specific parameters may then be sent back to the gNBs. As indicated by block 910, from this moment on, the gNB may configure all UEs with the new beam-group specific parameters and the process may return to 904 as indicated by arrow 911. This can use conventional RRC reconfigurations such as, for example, whenever a UE is switched to a beam which uses a different parameter (e.g. CIO), i.e. which belongs to a different group, the gNB may send an RRC reconfiguration update with the new parameter. The gNB may also reset the KPI counting, when it has received new beam-group specific parameters.

With the example shown in FIG. 10, the method may comprise multiple loops including loop comprising 905 and loop comprising 911. In the first loop beam specific KPIs 30 (see for example the beam specific KPIs shown in FIGS. 7 and 8) from 900 may be at least partially used to initially define the groups; no beam-group specific KPIs 31 having been established yet. Then, after the first initial grouping is performed to organize and define the groups, that grouping may then be used to generate the beam-group specific KPIs 31. This may be done by transmitting the grouping information from the network entity 300 to the base station (such as the gNBs shown in FIG. 9). The base station may then use this grouping information and create the beam-group specific KPIs 31 and transmit the beam-group specific KPIs 31 to the network entity 300. Thus, the first loop would comprise 900-906 and then back to 902 for the first loop. Another subsequent loop may comprises 904-910 and then back to 904. Steps 908 and 910 may occur concurrently with this loop after 906. Thus, the first loop can use the beam specific KPIs 30 for generating the beam-group specific KPIs 31, and the another subsequent loop can use a prior beam-group specific KPIs 31 to form subsequent beam-group specific KPIs. Thus, in the first loop the KPI 39 in FIG. 9 transmits beam specific KPIs 30, but in a subsequent loops the KPI 39 transmits beam-group specific KPIs 31.

Stated another way, for the second loop:
The second loop (including 911) starting with 904 assumes that the beam groups are statically defined by the network entity such as, for example, the gNB receives the grouping information 36 from the network entity.

In 904, the gNB may generate beam-group specific KPIs and may aggregate them over a certain period.

In 906, the gNB may send the beam-group specific KPIs 31 to the network entity at the end of the period.

In 908, the network entity may determine beam-group specific mobility parameters 34 from the beam group specific KPIs, and may send them to the gNB.

Finally, in 910, the gNB may configure the UEs with the determined beam-group specific mobility parameters and may reset the beam-group specific KPIs This process may be repeated again based on the group definition received from the network entity such as, for example, the gNB may generate beam-group specific KPIs in 904.

Also, stated another way for the first loop:
The first loop (including 905) may adapt the group definitions semi-statically such as, for example, on a much slower time scale than the second loop 911.

In 900, the beam groups may be initialized such as, for example, only a single group comprising all beams is defined.

In 902, the network entity may adapt the group definition. For example, it may split a group into at least two groups, or it may combine at least two groups into a single group.

For this adaptation, step 902 may reuse the beam group specific KPIs 31 which may be generated and aggregated in 904 (based on the current group definition), and may be sent to the network entity in 906 anyway.

The adaptation of the group definition in 902 might not be executed every time the network entity receives beam-group specific KPIs 31. Instead, the network entity may analyze the beam-group specific KPIs 31 over a longer time; before it decides to adapt the group definition.

Examples for the adaption in 902 are provided in FIG. 12 [0078-0083]

902 may analyze the beam-group specific KPIs from time to time such as, for example, once a weak. If it finds conflicting KPIs, it will try to split the group with conflicting KPIs. If it finds groups with identical behavior, it may combine them to a single group. Please note that the time durations mentioned herein may be any suitable time duration, and the time durations are merely given as being examples and non-limiting.

Figure 11A:
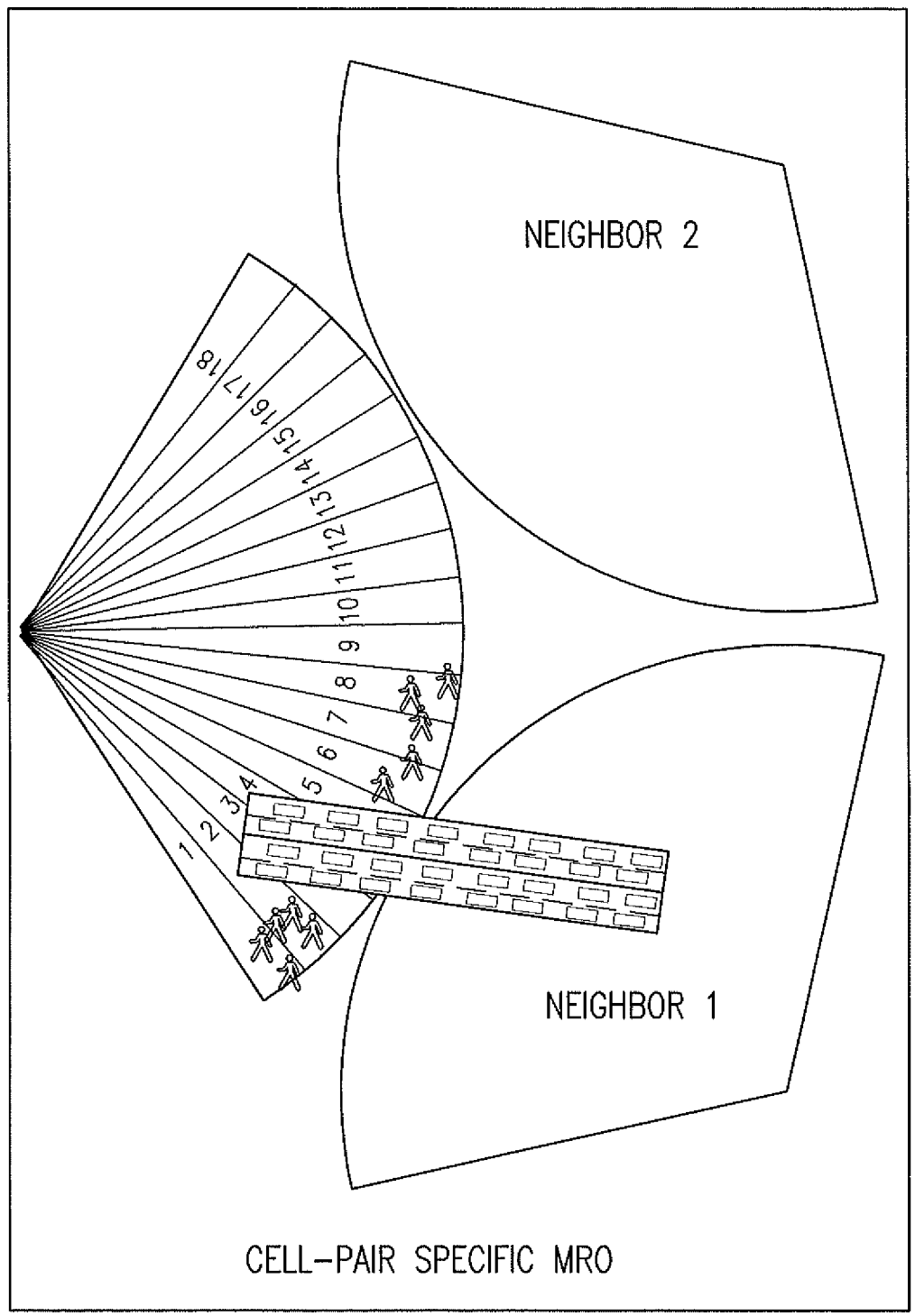
FIG. 11A is a schematic diagram illustrating an example of features for a cell-pair specific mobility robustness optimization.
Figure 11B:
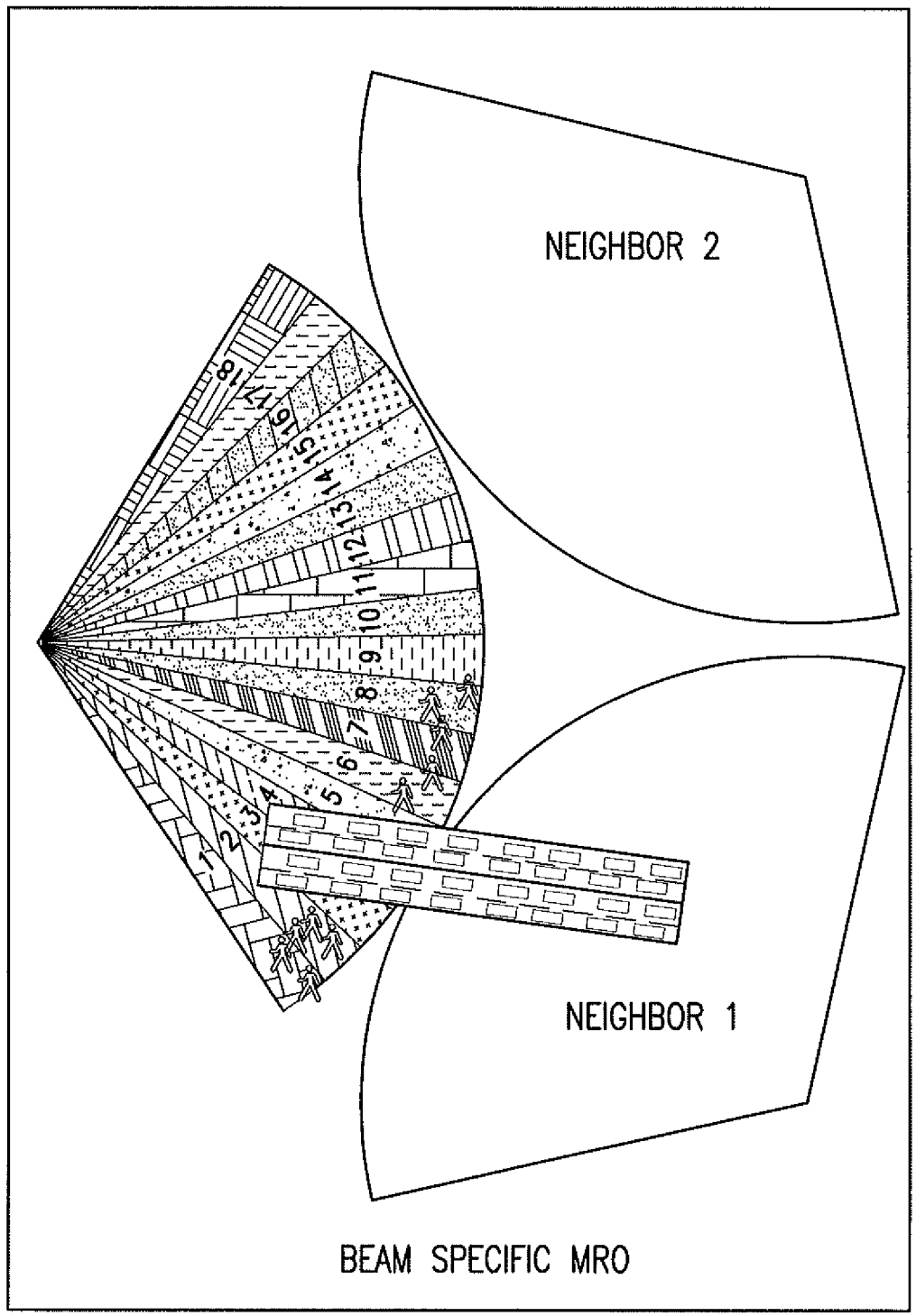
FIG. 11B is a schematic diagram illustrating an example of features for a beam specific mobility robustness optimization.
Figure 11C:
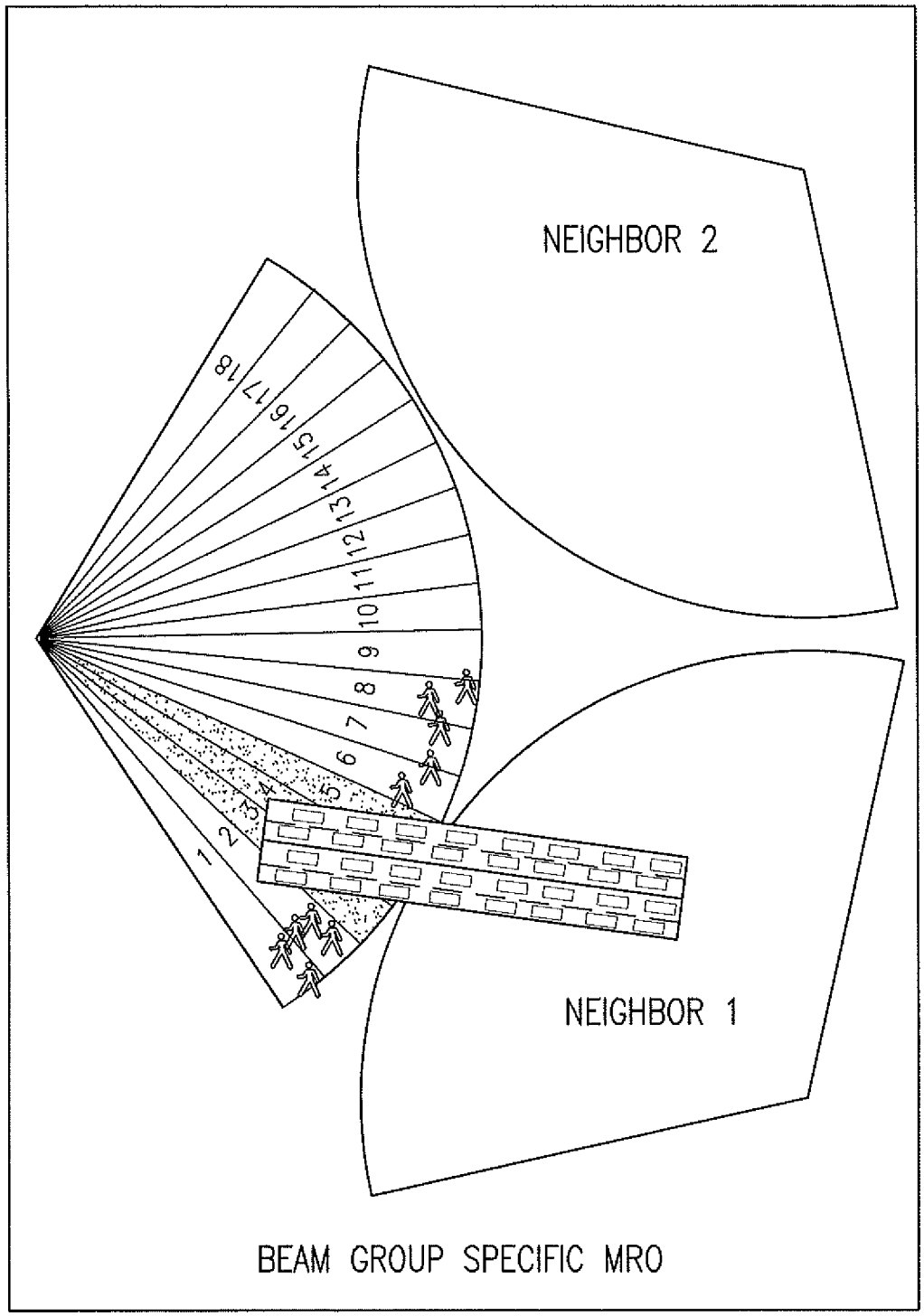
FIG. 11C is a schematic diagram illustrating an example of features for a beam group specific mobility robustness optimization.

Referring also to FIGS. 11A, 11B and 11C, examples of cell-pair specific MRO, beam specific MRO and beam-group specific MRO are shown respectively. These figures show a cell of interest on the left (which optimizes its mobility parameters), as well as two neighboring cells (however, only the bottom neighbor 1 is of interest in this example). The left cell is using beamforming with 18 beams, the neighboring cells may or may not use beamforming. Users in the left cell enter the bottom neighbor 1 either via a street (i.e. fast users), or at other places (pedestrians).

FIG. 11A shows the conventional case, where MRO would optimize just a single CIO parameter for the cell boundary from the left cell to the bottom neighbor cell 1 (indicated by the same color for every beam). FIG. 11B shows the conventional beam specific MRO, where MRO would optimize a separate parameter for every beam (with all the disadvantages mentioned above). FIG. 11C shows the new beam-group specific MRO method. The cell boundary between the left cell and the bottom neighbor cell 1 is not divided into 18 individual beams (or 9, respectively, since beam 10-18 may not be relevant for the bottom neighbor 1), but only into 2 different beam groups. One beam group comprises the beams where the street (with the fast UEs) is originated, i.e. beam 3,4,5. The other group comprises the remaining beams (with only slow users) 1-2 and 6-18. MRO would optimize two CIOs in this case; instead of 18 CIOs in the beam-specific case of FIG. 11B (saving complexity and gaining robustness) or instead of a single one in the cell-pair specific case of FIG. 11A (exploiting almost the full performance gain of beam specific MRO).

The following is an example description regarding how grouping may be done. By default, every cell may use a conventional beam-specific MRO. For the example described above in FIG. 11A, this means that the optimizer may configure a single group per boundary comprising all beams. In the example above, the optimizer would detect conflicting KPIs, i.e. it would detect too-late handovers (which suggest earlier handover/higher CIO), which are produced by the street users, too-earlier handover and ping-pongs (which suggest later handover), which are produced by the pedestrians.

Figure 12A:
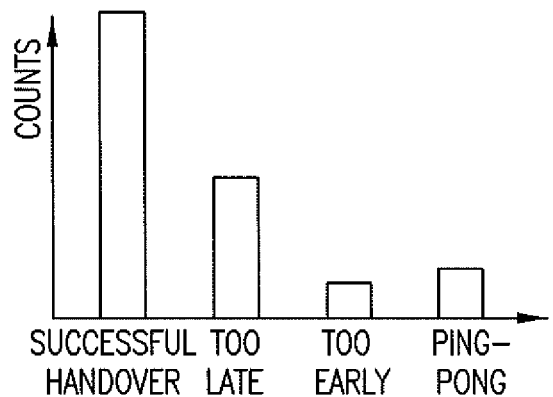
FIG. 12A is a diagram illustrating how conflicts may be detected with too-lates, too-earlies and ping-pongs.
Figure 12B:
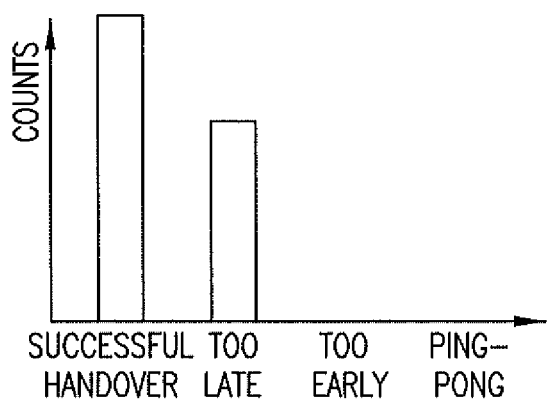
FIG. 12B is a diagram illustrating how conflicts may be detected with too-lates.
Figure 12C:
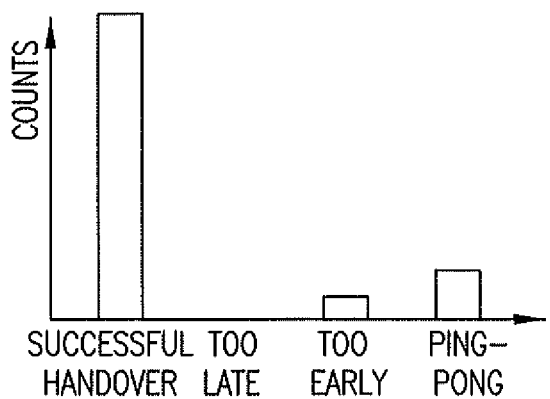
FIG. 12C is a diagram illustrating how conflicts may be detected with too-earlies and ping-pongs.

FIGS. 12A-12C show examples for detecting a conflict. The y-axis shows the mobility KPIs reported for a certain cell edge (or later on a beam specific KPI). FIG. 12A suggests that there is a conflict, there are many too-lates, but there are also too-earlies and ping-pons. So, increasing the CIO, to make handovers earlier, is very likely to accidentally increase too-earlies and ping-pongs. In contrast, the FIGS. 12B and 12C do not show conflicts. There are either too-lates as shown in FIG. 12B or too-earlies/ping-pongs as shown in FIG. 12C, but not at the same time. Note that conflicts may still show up later on. For example, in regard to FIG. 12B, MRO would try to resolve the too-lates and may thereby generate too-earlies/ping-pongs as in FIG. 12A. Hence, the conflict may be hidden at the beginning, but after some MRO optimization steps, we would get the situation as shown in FIG. 12A which finally reveals the conflict.

From this conflict, the optimizer may conclude that a split of the boundary could be helpful. Unfortunately, the optimizer has no beam-resolved information at this point in time. There are several options to get this beam-resolved information.

In a brute force method, the optimizer may temporarily instruct the gNB to provide beam-specific KPIs. These KPIs would not necessarily be used to do fully-fledged beam-specific MRO, but only to do the grouping. Thus, these KPIs do not need to be super-exact, and UEs may not need to be involved, i.e. this method would not suffer from the disadvantages of beam-specific MRO. Although not 100 percent accurate, these results would provide a good picture that KPIs on beam 3,4, and 5 would show a significantly different trend than KPIs on the other beams. Namely, beam 3, 4 and 5 would show a lot of too-late handovers, whereas the others would either not show any handover problems, or would show too-early handovers and/or ping-pongs.

In a simpler method, the optimizer may split the boundary into equal part such as, for example, the optimizer may define three beam groups, one covering beams 1-3, a second with 4-6 and a third with 7-9 using the example in FIG. 11. This method will obviously not lead to optimal behavior, at least not in the first step. However, it will already lead to improvements in many cases (it will significantly improve the pedestrians in beams 7-9). Furthermore, it can be refined in subsequent steps, such as a second and a third step. For instance, in a second step, the optimizer will still detect KPI conflicts in beam group 1 (beam 1-3) and may further split this beam. In a subsequent third step, the optimizer may observe same behavior (only too-late handovers) in some beam groups and recombines them. Note that the grouping is mainly influenced by the infrastructure and, thus, is constant over a very long time. This simple method may take longer to converge to a good state, but convergence time is not very critical here.

In another method, when the optimizer detects a conflict, it may also do a grouping by identifying special infrastructure, and may correlate this information with beam angles, positions, etc. for example, the identifying special infrastructure may comprise streets using maps. This may also not lead to an optimal solution, but may still lead to significant improvements (and it can support the blind splitting of the previous section). For instance:

Using image processing, geographical coordinates of streets can be determined

Using gNB coordinates, beam angles and propagation models, the optimizer can derive which beams are covering the special infrastructure.

Alternatively, the optimizer may also have MDT (Minimization of Drive Test) data available, which may contain beam-resolved measurements of the UEs along with GPS coordinates.

With that, the optimizer may find out the beams which cover the streets on the cell edge.

Alternative methods may be compiled out of ingredients of the methods described above. For example, instead of initializing the method with conventional cell-pair specific MRO, the method may be initialized with the fine-granular beam-specific MRO, and afterwards combine beams whose KPIs suggest similar mobility behavior. Again, beam-specific MRO does not need to be 100 percent accurate since it is only used as an initial temporary method for grouping, such that the disadvantages of beam-specific MRO are irrelevant on the long-term. The method with geo-coordinates may also be used standalone such as, for example, without being triggered by a conflict.

Figure 13:
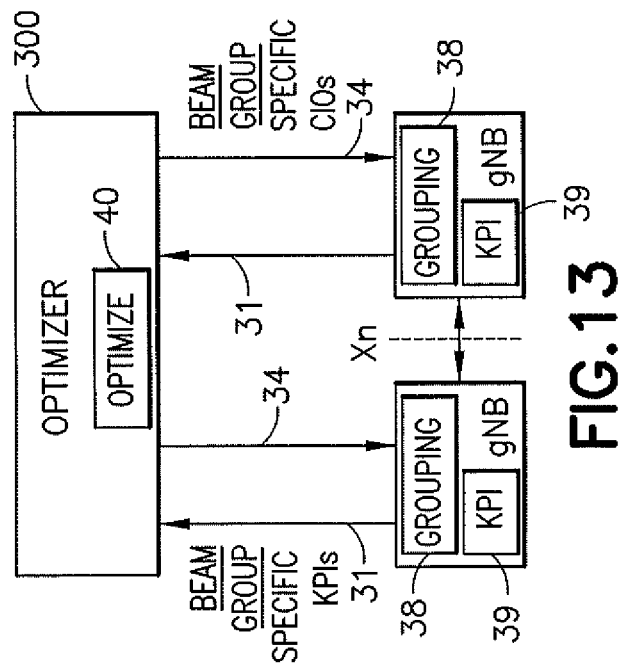
FIG. 13 is a schematic diagram illustrating features of another example of a beam-group-based mobility robustness optimization.

Referring also to FIG. 13, another example embodiment will be described. In this example, the optimizer in the entity 300 may be performing the optimization 40, whereas grouping 38 and KPI generation 39 is done at the gNBs. Performing the grouping 38 will certainly put additional burden to the gNBs, but the gNBs have maximum knowledge of their radio environment and, thus, may do more optimal beam grouping than the optimizer. Having the optimization in a central location may still be favorable since monitoring of the parameters may be done along with other parameters (conventional MRO implementations are also centralized in many cases due to the same reason). The optimizer may be aware that the KPIs are per beam group, so this option is not transparent for the optimizer and, thus, may be specified in SA5. Although not fundamentally needed, it might be helpful to provide the grouping information to the optimizer.

Figure 14:
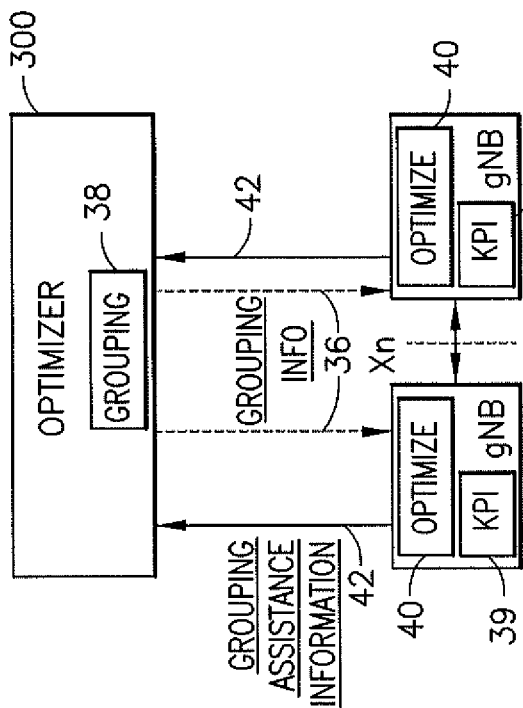
FIG. 14 is a schematic diagram illustrating features of another example of a beam-group-based mobility robustness optimization.

Referring also to FIG. 14, another example embodiment will be described. In this example, the optimizer in the entity 300 is only proving the grouping information 38 to the gNBs, the remaining part of the MRO is executed in the gNBs. Input information for beam grouping is not very obvious in this option. It may still have geographical information (e.g. infrastructure such as street, rails, etc.). It may also have further information ("grouping assistance info") 42 from the gNBs which is provided for other purposes, or temporarily switch to beam-specific KPIs as shown in FIG. 8.

Figure 15:
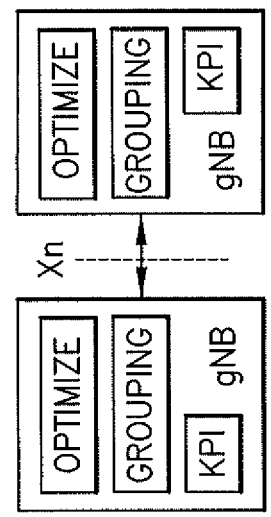
FIG. 15 is a schematic diagram illustrating features of another example of a beam-group-based mobility robustness optimization.

Referring also to FIG. 15, for the sake of completeness, it should also be mentioned that the method may also be fully implemented inside the gNBs.

With group based MRO, as compared with beam-based MRO, backward comparability such as applicable for legacy/Release 15 UEs for example, may be provided. With group based MRO, as compared with beam-based MRO, there will be reduced complexity. With group based MRO, as compared with beam-based MRO, there will be better performance due to better root cause evaluation (less ambiguities when failures happen after beam switches). With group based MRO, as compared with beam-based MRO, there will be faster convergence due to better statistics in beam groups.

Regarding impacts on standardization this impacts the definition of KPIs (performance management) and parameters (configuration management) in SA5, e.g. 3GPP 28.552 (PM), 28.554 (PM), 28.541 (CM). Also, in ORAN, this method may be implemented as x-APP in the RIC and, thus, will impact the E2 interface (see below).

Figure 16:
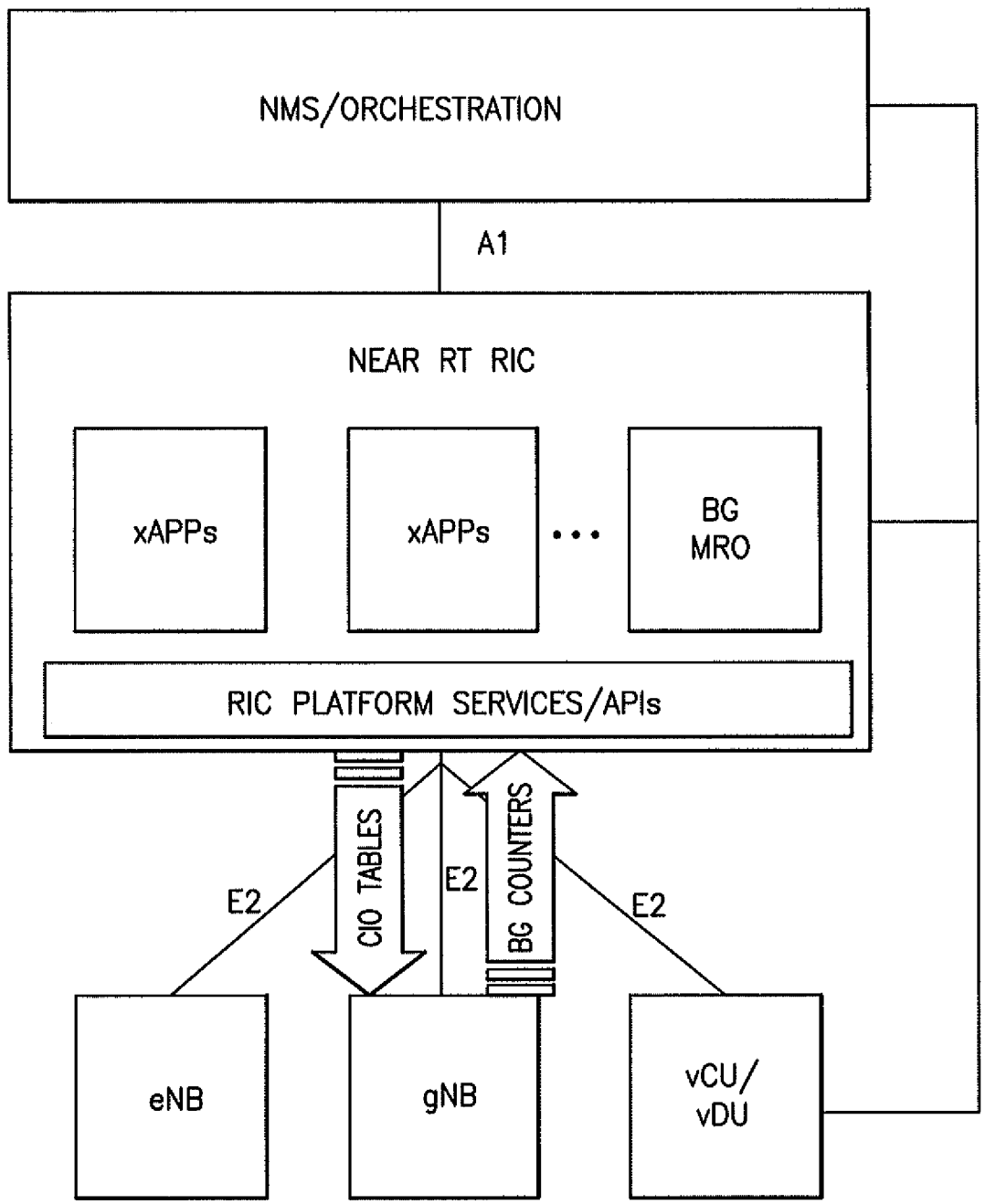
FIG. 16 is a schematic diagram illustrating an example of open radio access network near RT RIC and gNBs architecture.

FIG. 16 presents an example architecture of a near Real-Time Radio Intelligent Controller (Near RT RIC) and a proposal for BG MRO implementation over Open RAN (O-RAN) architecture. The implementation of this innovation on the O-RAN (Open RAN) may comprise the following interfaces to support BG MROs:

E2 interface: The E2 interfaces must support communicating the BG HO counters with the near RT RIC in addition to update mobility parameters such CIO table back to gNBs.

Near RT RIC should support hosting the BG-based MRO and provide the aggregated report or KPI to Network Management System (NMS)/Orchestration.

As noted above, optimizing the HO parameters on the cell-level may suffer from fast-slow HOs deadlock, on one hand. On the other hand, the beam-based MRO also has shown to be too granular for most MRO uses cases, which reduces the convergence rate (i.e. it takes longer until the optimization converges due to less observations/events per beam), and results in huge signaling overhead. Features as described herein may be used to prevent this issues. Conventional work in this area regarding beam specific MRO, considers only the last beam, from which the handover or failure has been initiated; in beam-based MRO, the guilty beam is not always the last beam connected, or the beam that the entering condition applied (as it was assumed in the prior art). However, the proper time to enter HO condition is when the UE is somewhere before entering the last guilty beam and leaving the first good beam of the cell. Features as described herein may be used to address this.

Features as described herein may be used to improve determination of a suitable beam to start HO avoiding RLF and determination of related mobility parameters (key parameter values) of MRO algorithm. The MRO algorithm may determine which beams of the cell may build/be summarized into a group of beams, define which key mobility parameter settings may be suitable for the group of beams and optimize the mobility parameters of MRO (CIO, TTT) related to the group of beams (instead of considering each beam individually); configure beams used by the UE according to the optimized key parameter settings determined for the group of beams (without changing the UE). The concepts of using a group of beams, a new IE to define KPI for a group of beams, and to exchange them between base station and a core network node/MRO are new.

The gNBs may generate the beam-group specific KPIs based on grouping information provided by the optimizer. This will provides significant complexity benefits to the KPI generation and the root cause evaluation, and it will also make the KPIs more robust (since identifying a suboptimal beam GROUP parameter is much simpler than identifying a suboptimal beam parameter).

The grouping in the optimizer may be done based on beam-group specific KPIs provided by the gNBs, on geographical information, on previous optimization cycles, and/or on any other information available in the optimizer. For instance, the following rules can be applied to adapt/modify/optimize the group allocations):

The method could be initialized with beam specific MRO (i.e. every beam is a group), or with cell-pair specific MRO (all beams form a single group).

Beam groups with similar behavior/similar KPIs may be summarized/combined to a bigger group.

In accordance with one example embodiment, an apparatus may be provided comprising: at least one processor; and at least one non-transitory memory including computer program code, the at least one memory and the computer program code configured to, with the at least one processor, cause the apparatus to: associate communication beams into at least two different groups, where at least one of the groups has at least two of the communication beams; based upon beam-group specific key performance indicators, where the beam-group specific key performance indicators have been based upon the association of the communication beams into the at least two different groups, use the beam-group specific key performance indicators to determine at least one beam-group specific mobility parameter for at least one of the groups of communication beams; and transmit the at least one beam-group specific mobility parameter to a base station.

A first one of the groups of communication beams may comprise a first plurality of the communication beams and a second one of the groups of communication beams may comprise a different second plurality of the communication beams. The apparatus may be configured to associate key performance indicators, received from the base station, to a first one of the at least two different group of beams comprising at least one of: use of geographical data, use of beam resolved information, or use of a previous beam-group specific key performance indicator. The key performance indicators, received from the base station, may comprise the beam-group specific key performance indicators or beam specific key performance indicators. The apparatus comprises a network entity. The apparatus may be configured to generate the beam-group specific key performance indicators based on at least one of: information from a failure event or a handover event received from a user equipment, or information from a failure event or a handover event received from a base station. The apparatus may be configured to signal mobility group parameters and group definition to a user equipment for the user equipment to autonomously select a correct mobility group parameter. The apparatus may be configured to receive the beam-group specific key performance indicators from the base station. The apparatus may be configured to receive beam specific key performance indicators, associate the communication beams into the at least two different groups based upon the received beam specific key performance indicators, and send grouping information to the base station. The apparatus may be configured to: receive the beam-group specific key performance indicators from the base station, and at least partially reassign the association of the communication beams into at least two groups based, at least partially, upon the received beam-group specific key performance indicators. The apparatus may be configured to use the beam-group specific key performance indicators to determine at least two different respective beam-group specific mobility parameters for at least two of the groups of communication beams; and transmit the at least two beam-group specific mobility parameters to the base station.

An example method may be provided comprising: associating communication beams into at least two different groups, where at least one of the groups has at least two of the communication beams; based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams; and transmitting the at least one beam-group specific mobility parameter to a base station.

A first one of the groups of communication beams may comprise a first plurality of the communication beams and a second one of the groups of communication beams may comprise a different second plurality of the communication beams. The associating may comprise at least one of: use of geographical data, use of beam resolved information, or use of a previous beam-group specific key performance indicator. The method may further comprise receiving key performance indicators from the base station which comprise beam-group specific key performance indicators or beam specific key performance indicators. The method may be performed with a network entity. The method may be configured to generate the beam-group specific key performance indicators based on at least one of: information from a failure event or a handover event received from a user equipment, or information from a failure event or a handover event received from a base station. The method may be configured to signal mobility group parameters and group definition to a user equipment or the base station for the user equipment to autonomously select a correct mobility group parameter. The method may comprise receiving beam-group specific key performance indicators from the base station. The method may comprise receiving beam specific key performance indicators, associating the communication beams into the at least two different groups based upon the received beam specific key performance indicators, and sending grouping information to the base station. The method may comprise: receiving the beam-group specific key performance indicators from the base station, and at least partially reassigning the association of the communication beams into at least two groups based, at least partially, upon the received beam-group specific key performance indicators. The method may comprise using the beam-group specific key performance indicators to determine at least two different respective beam-group specific mobility parameters for at least two of the groups of communication beams; and transmitting the at least two beam-group specific mobility parameters to the base station.

An example embodiment may be provided comprising a non-transitory program storage device readable by a machine, tangibly embodying a program of instructions executable by the machine for performing operations, the operations comprising associating communication beams into at least two different groups, where at least one of the groups has at least two of the communication beams; based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams; and transmitting the at least one beam-group specific mobility parameter to a base station.

An example embodiment may be provided comprising: means for associating communication beams into at least two different groups, where at least one of the groups has at least two of the communication beams; means for, based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams; and means for transmitting the at least one beam-group specific mobility parameter to a base station.

An example embodiment may be provided comprising: processing circuitry and memory circuitry comprising computer program code configured for associating communication beams into at least two different groups, where at least one of the groups has at least two of the communication beams; based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams; and transmitting the at least one beam-group specific mobility parameter to a base station.

An example embodiment may be provided with an apparatus comprising: at least one processor; and at least one non-transitory memory including computer program code, the at least one memory and the computer program code configured to, with the at least one processor, cause the apparatus to: based, at least partially, upon key performance indicators regarding communication beams, associate the communication beams into at least two different groups, where at least one of the groups has at least two of the communication beams; and based upon the association of the communication beams into the at least two different groups, generate grouping information, where the grouping information is configured to be used to generate beam-group specific key performance indicators.

The key performance indicators may comprise beam-group specific key performance indicators or beam specific key performance indicators. The beam-group specific key performance indicators may be received by the apparatus from a base station. The apparatus may be configured to use the beam-group specific key performance indicators to generate beam-group specific mobility parameters. The apparatus may be configured to transmit the beam-group specific mobility parameters to a base station. The apparatus may be configured to transmit at least one of the beam-group specific mobility parameters to a user equipment. The apparatus may be configured to transmit the grouping information to a base station. The apparatus may comprise one of a network entity or a base station.

An example method may be provided comprising: based, at least partially, upon key performance indicators regarding communication beams, associating the communication beams into at least two different groups, where at least one of the groups has at least two of the communication beams; and based upon the associating of the communication beams into the at least two different groups, generating grouping information, where the grouping information is configured to be used to generate beam-group specific key performance indicators.

The key performance indicators may comprise beam-group specific key performance indicators or beam specific key performance indicators. The method may further comprise receiving the beam-group specific key performance indicators from a base station. The method may further comprise using the beam-group specific key performance indicators to generate beam-group specific mobility parameters. The method may further comprise transmitting the beam-group specific mobility parameters to a base station. The method may further comprise transmitting at least one of the beam-group specific mobility parameters to a user equipment. The method may further comprise transmitting the grouping information to a base station. The method may be performed in one of a network entity or a base station.

An example embodiment may be provided with a non-transitory program storage device readable by a machine, tangibly embodying a program of instructions executable by the machine for performing operations, the operations comprising: based, at least partially, upon key performance indicators regarding communication beams, associating the communication beams into at least two different groups, where at least one of the groups has at least two of the communication beams; and based upon the associating of the communication beams into the at least two different groups, generate grouping information, where the grouping information is configured to be used to generate beam-group specific key performance indicators.

An example embodiment may be provided comprising: means for, based, at least partially, upon key performance indicators regarding communication beams, associating the communication beams into at least two different groups, where at least one of the groups has at least two of the communication beams; and means for, based upon the associating of the communication beams into the at least two different groups, generating grouping information, where the grouping information is configured to be used to generate beam-group specific key performance indicators.

An example embodiment may be provided comprising: processing circuitry and memory circuitry comprising computer program code configured for, based at least partially upon key performance indicators regarding communication beams, associating the communication beams into at least two different groups, where at least one of the groups has at least two of the communication beams; and based upon the associating of the communication beams into the at least two different groups, generating grouping information, where the grouping information is configured to be used to generate beam-group specific key performance indicators.

An embodiment may be provide with an apparatus comprising: at least one processor; and at least one non-transitory memory including computer program code, the at least one memory and the computer program code configured to, with the at least one processor, cause the apparatus to: based, at least partially, upon grouping information regarding communication beams, generate beam-group specific key performance indicators, where the grouping information comprises information regarding the communication beams having been grouped into at least two respective groups, where at least one of the groups comprises at least two of the communication beams; and based, at least partially, upon the generation of the beam-group specific key performance indicators, cause the beam-group specific key performance indicators to be sent, where the beam-group specific key performance indicators are configured to be used to create respective beam-group specific mobility parameters for use with initiation of a handover.

The apparatus may be configured to receive the grouping information from a network entity. The apparatus may be configured to associate the communication beams into the at least two different groups. The apparatus may be configured to receive beam-group specific key performance indicators. The apparatus may be configured to receive beam specific key performance indicators. The apparatus may be configured to transmit the beam-group specific key performance indicators to a network entity. The apparatus may be configured to transmit beam specific key performance indicators to the network entity. The apparatus may be configured to use the beam-group specific key performance indicators to generate the beam-group specific mobility parameters. The apparatus may be configured to transmit the beam-group specific key performance indicators to a network entity for creating the beam-group specific mobility parameters. The apparatus may be configured to receive the beam-group specific mobility parameters from the network entity. The apparatus may be configured to use at least one of the beam-group specific mobility parameters to initiate the handover.

An example method may be provided comprising: based, at least partially, upon a grouping information regarding communication beams, generating beam-group specific key performance indicators, where the grouping information comprises information regarding the communication beams having been grouped into at least two respective groups, where at least one of the groups comprises at least two of the communication beams; and based, at least partially, upon the generating of the beam-group specific key performance indicators, causing the beam-group specific key performance indicators to be sent, where the beam-group specific key performance indicators are configured to be used to create respective beam-group specific mobility parameters for use with initiation of a handover.

The method may further comprise receiving the grouping information from a network entity. The method may further comprise associating the communication beams into the at least two different groups. The method may further comprise receiving beam-group specific key performance indicators. The method may further comprise receiving beam specific key performance indicators. The method may further comprise further comprising transmitting the beam-group specific key performance indicators to a network entity. The method may further comprise transmitting beam specific key performance indicators to the network entity. The method may further comprise using the beam-group specific key performance indicators to generate the beam-group specific mobility parameters. The method may further comprise transmitting the beam-group specific key performance indicators to a network entity for creating the beam-group specific mobility parameters. The method may further comprise receiving the beam-group specific mobility parameters from the network entity. The method may further comprise using at least one of the beam-group specific mobility parameters to initiate the handover.

An example embodiment may be provided with a non-transitory program storage device readable by a machine, tangibly embodying a program of instructions executable by the machine for performing operations, the operations comprising: based, at least partially, upon a grouping information regarding communication beams, generating beam-group specific key performance indicators, where the grouping information comprises information regarding the communication beams having been grouped into at least two respective groups, where at least one of the groups comprises at least two of the communication beams; and based, at least partially, upon the generating of the beam-group specific key performance indicators, causing the beam-group specific key performance indicators to be sent, where the beam-group specific key performance indicators are configured to be used to create respective beam-group specific mobility parameters for use with initiation of a handover.

An example embodiment may be provided comprising: means for, based at least partially upon a grouping information regarding communication beams, generating beam-group specific key performance indicators, where the grouping information comprises information regarding the communication beams having been grouped into at least two respective groups, where at least one of the groups comprises at least two of the communication beams; and means for, based at least partially upon the generating of the beam-group specific key performance indicators, causing the beam-group specific key performance indicators to be sent, where the beam-group specific key performance indicators are configured to be used to create respective beam-group specific mobility parameters for use with initiation of a handover.

An example embodiment may be provided comprising: processing circuitry and memory circuitry comprising computer program code configured for, based at least partially upon a grouping information regarding communication beams, generating beam-group specific key performance indicators, where the grouping information comprises information regarding the communication beams having been grouped into at least two respective groups, where at least one of the groups comprises at least two of the communication beams; and based, at least partially, upon the generating of the beam-group specific key performance indicators, causing the beam-group specific key performance indicators to be sent, where the beam-group specific key performance indicators are configured to be used to create respective beam-group specific mobility parameters for use with initiation of a handover.

An example embodiment may be provided with an apparatus comprising: at least one processor; and at least one non-transitory memory including computer program code, the at least one memory and the computer program code configured to, with the at least one processor, cause the apparatus to: based, at least partially, upon beam-group specific key performance indicators, generate beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generation of the beam-group specific mobility parameters, at least partially cause at least one of the beam-group specific mobility parameters to be sent for subsequent use by a user equipment for sending a measurement report.

With one example implementation the gNB will send only one of the parameters to the UE (i.e. the one associated to the beam that the UE is currently connected to). A big advantage is that the UE implementation does not need to be changed for that. An alternative is where the gNB sends all beam-group specific parameters to the UE, and the UE autonomously selects. This maybe the more elegant method, but it may require to change the UEs (i.e. legacy UEs would not benefit). Technically, the handover is decided at the gNB; but usually, the gNB decides handover based on measurement reports received from the UE. So the UE may use the mobility parameter to send the measurement report at the right time, such that the gNB can decide handover.

The apparatus may be configured to receive the beam-group specific key performance indicators. The apparatus may be configured to generate the beam-group specific key performance indicators. The apparatus may be configured to transmit the beam-group specific mobility parameters to a base station. The apparatus may be configured to transmit at least one of the beam-group specific mobility parameters to a user equipment. The apparatus may be configured to receive grouping information for creating the beam-group specific key performance indicators. The apparatus may be configured to transmit grouping information for creating the beam-group specific key performance indicators. The at least partially causing of the at least one of the beam-group specific mobility parameters to be sent may comprise the apparatus being configured to transmit the beam-group specific mobility parameters to a base station.

An example method may be provide comprising: based, at least partially, upon beam-group specific key performance indicators, generating beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generating of the beam-group specific mobility parameters, at least partially causing at least one of the beam-group specific mobility parameters to be sent for subsequent use by a user equipment for sending a measurement report.

The method may further comprise receiving the beam-group specific key performance indicators. The method may further comprise generating the beam-group specific key performance indicators. The method may further comprise transmitting the beam-group specific mobility parameters to a base station. The method may further comprise transmitting at least one of the beam-group specific mobility parameters to a user equipment. The method may further comprise receiving grouping information for creating the beam-group specific key performance indicators. The method may further comprise transmitting grouping information for creating the beam-group specific key performance indicators. The at least partially causing of the at least one of the beam-group specific mobility parameters to be sent may comprise transmitting the beam-group specific mobility parameters to a base station.

An example embodiment may be provided with a non-transitory program storage device readable by a machine, tangibly embodying a program of instructions executable by the machine for performing operations, the operations comprising: based, at least partially, upon beam-group specific key performance indicators, generating beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generating of the beam-group specific mobility parameters, at least partially causing at least one of the beam-group specific mobility parameters to be sent for subsequent use by a user equipment for sending a measurement report.

An example embodiment may be provided comprising: means for, based at least partially upon beam-group specific key performance indicators, generating beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and means for, based at least partially upon the generating of the beam-group specific mobility parameters, at least partially causing at least one of the beam-group specific mobility parameters to be sent for subsequent use by a user equipment for sending a measurement report.

An example embodiment may be provided comprising: processing circuitry and memory circuitry comprising computer program code configured for, based at least partially upon beam-group specific key performance indicators, generating beam-group specific mobility parameters, where the beam-group specific mobility parameters comprise at least a first beam-group specific mobility parameter for a first group of communication beams and a second beam-group specific mobility parameter for a second group of communication beams, where at least one of the groups of communication beams comprises at least two communication beams; and based, at least partially, upon the generating of the beam-group specific mobility parameters, at least partially causing at least one of the beam-group specific mobility parameters to be sent for subsequent use by a user equipment for sending a measurement report.

An example embodiment may be provided with an apparatus comprising: at least one processor; and at least one non-transitory memory including computer program code, the at least one memory and the computer program code configured to, with the at least one processor, cause the apparatus to: receive information comprising grouping information; generate a plurality of beam-group specific key performance indicators based, at least partially, upon the received grouping information; transmit the plurality of beam-group specific key performance indicators to a network entity; receive information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially cause use of the first beam-group specific mobility parameter for sending of a measurement report to the apparatus.

The apparatus may be configured to transmit the first beam-group specific mobility parameter to a user equipment. The apparatus may be configured to signal the second beam-group specific mobility parameter to the user equipment, and signal at least one group definition to the user equipment for the user equipment to autonomously select at least one of the first or second beam-group specific mobility parameters. The apparatus may be configured to transmit a plurality of beam specific key performance indicators to the network entity. The first group of communication beams may comprise a plurality of the communication beams, where the first one of the beam-group specific mobility parameters is associated with the first group of communication beams. The apparatus may be configured to receive the measurement report from a user equipment for initiating a handover.

An example embodiment may be provided with a method comprising: receiving information comprising grouping information; generating a plurality of beam-group specific key performance indicators based, at least partially, upon the received grouping information; transmitting the plurality of beam-group specific key performance indicators to a network entity; receiving information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially causing use of the first beam-group specific mobility parameter for sending of a measurement report to the apparatus.

The method may further comprise transmitting the first beam-group specific mobility parameter to a user equipment. The method may further comprise signaling the second beam-group specific mobility parameter to the user equipment, and signaling at least one group definition to the user equipment for the user equipment to autonomously select at least one of the first or second beam-group specific mobility parameters. The method may further comprise transmitting a plurality of beam specific key performance indicators to the network entity. The first group of communication beams may comprise a plurality of the communication beams, and the method may further comprise the first one of the beam-group specific mobility parameters being associated with the first group of communication beams. The method may further comprise receiving the measurement report from a user equipment for initiating a handover.

An example embodiment may be provided with a non-transitory program storage device readable by a machine, tangibly embodying a program of instructions executable by the machine for performing operations, the operations comprising: receiving information comprising grouping information; generating a plurality of beam-group specific key performance indicators based, at least partially, upon the received grouping information; transmitting the plurality of beam-group specific key performance indicators to a network entity; receiving information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially causing use of the first beam-group specific mobility parameter for sending of a measurement report to the apparatus.

An example embodiment may be provided comprising: means for receiving information comprising grouping information; means for generating a plurality of beam-group specific key performance indicators based, at least partially, upon the received grouping information; means for transmitting the plurality of beam-group specific key performance indicators to a network entity; means for receiving information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and means for at least partially causing use of the first beam-group specific mobility parameter for sending of a measurement report to the apparatus.

An example embodiment may be provided comprising: processing circuitry and memory circuitry comprising computer program code configured for receiving information comprising grouping information; generating a plurality of beam-group specific key performance indicators based, at least partially, upon the received grouping information; transmitting the plurality of beam-group specific key performance indicators to a network entity; receiving information from the network entity comprising beam-group specific mobility parameters, where the beam-group specific mobility parameters comprise a first one of the beam-group specific mobility parameters associated with a first group of communication beams and a different second one of the beam-group specific mobility parameters associated with a different second group of communication beams; and at least partially causing use of the first beam-group specific mobility parameter for sending of a measurement report to the apparatus.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory storing instructions that, when executed by the at least one processor, cause the apparatus at least to:
   associate communication beams into at least two different groups, where at least one of the groups has at least two of the communication beams;
   based upon beam-group specific key performance indicators, where the beam-group specific key performance indicators have been based upon the association of the communication beams into the at least two different groups, use the beam-group specific key performance indicators to determine at least one beam-group specific mobility parameter for at least one of the groups of communication beams;
   wherein the at least one beam-group specific mobility parameter comprises a first cell individual offset and a second cell individual offset;
   increase the first cell individual offset for a first group of beams associated with a first geographical area comprising at least one faster moving user equipment relative to at least one slower moving user equipment of a second geographical area; and
   decrease the second cell individual offset for a second group of beams associated with the second geographical area comprising the at least one slower moving user equipment relative to the at least one faster moving user equipment of the first geographical area; and
   transmit the at least one beam-group specific mobility parameter to a base station;
   wherein the at least one beam-group specific mobility parameter is related to handover initiation.

2. The apparatus as claimed in claim 1 where a first one of the groups of communication beams comprises a first plurality of the communication beams and a second one of the groups of communication beams comprises a different second plurality of the communication beams.

3. The apparatus as claimed in claim 1 where the apparatus is configured to associate key performance indicators, received from the base station, to a first one of the at least two different groups of beams, the associating comprising at least one of:
   use of geographical data,
   use of beam resolved information, or
   use of a previous beam-group specific key performance indicator.

4. The apparatus as claimed in claim 3 where the key performance indicators, received from the base station, comprise the beam-group specific key performance indicators or beam specific key performance indicators.

5. The apparatus of claim 3, wherein the geographical data comprises a first coverage area of a first one of the groups of communication beams, and a second coverage area of a second one of the groups of communication beams, the first coverage area being different from the second coverage area.

6. The apparatus of claim 5, wherein the first coverage area comprises at least one user equipment moving at a first speed, and the second coverage area comprises at least one user equipment moving at a second speed, the first speed being different from the second speed.

7. The apparatus as claimed in claim 1 where the apparatus comprises a network entity.

8. The apparatus as claimed in claim 1 where the beam-group specific key performance indicators are generated based on at least one of:
   information from a failure event or a handover event received from a user equipment, or information from a failure event or a handover event received from a base station.

9. The apparatus as claimed in claim 1 where the apparatus is configured to signal mobility group parameters and group definition to a user equipment for the user equipment to autonomously select a correct mobility group parameter.

10. The apparatus as claimed in claim 1 where the apparatus is configured to receive the beam-group specific key performance indicators from the base station.

11. The apparatus as claimed in claim 1 where the apparatus is configured to receive beam specific key performance indicators, associate the communication beams into the at least two different groups based upon the received beam specific key performance indicators, and send grouping information to the base station.

12. The apparatus as claimed in claim 11 where the apparatus is configured to:
   receive the beam-group specific key performance indicators from the base station, and
   at least partially reassign the association of the communication beams into at least two groups based, at least partially, upon the received beam-group specific key performance indicators.

13. The apparatus as claimed in claim 1 where the apparatus is configured to use the beam-group specific key performance indicators to determine at least two different respective beam-group specific mobility parameters for at least two of the groups of communication beams; and transmit the at least two beam-group specific mobility parameters to the base station.

14. The apparatus of claim 1, wherein the at least one beam-group specific mobility parameter comprises a cell individual offset.

15. The apparatus of claim 14, wherein the instructions, when executed by the at least one processor, cause the apparatus at least to:
increase the cell individual offset so that the handover initiation begins sooner; and
decrease the cell individual offset so that the handover initiation begins later.

16. The apparatus of claim 1, wherein the instructions, when executed by the at least one processor, cause the apparatus at least to:
receive the beam-group specific key performance indicators from the base station based on a first periodicity;
associate the communication beams into at least two different groups based on a second periodicity; and
transmit at least one definition that provides an indication of the at least two different groups to the base station based on the second periodicity;
wherein second periodicity is longer than the first periodicity.

17. The apparatus of claim 1, wherein the at least one beam-group specific mobility parameter comprises a time to trigger.

18. The apparatus of claim 17, wherein the instructions, when executed by the at least one processor, cause the apparatus at least to:
decrease the time to trigger so that the handover initiation begins sooner; and
increase the time to trigger so that the handover initiation begins is begun later.

19. The apparatus of claim 1, wherein the instructions, when executed by the at least one processor, cause the apparatus at least to:
decrease a first time to trigger for a first beam-group covering a first geographical area having at least one fast moving user equipment relative to at least one slow-moving user equipment in a second geographical area covered with a second beam-group; and
increase a second time to trigger for the second beam-group covering the second geographical area having the at least one slow moving user equipment relative to the at least one fast moving user equipment in the first geographical area.

20. The apparatus of claim 1, wherein the at least one beam-group specific mobility parameter is configured to be used to trigger transmission of a measurement report, the measurement report configured to be used for a decision of whether to initiate a handover procedure.

21. The apparatus of claim 1, wherein the apparatus comprises a mobility robustness optimization (MRO) network entity, and the at least one beam group specific mobility parameter is transmitted to the base station over an S1 interface for new radio (NR), or over an Itf-S or Itf-N interface for long-term evolution (LTE).

22. The apparatus of claim 1, wherein the beam-group specific key performance indicators are generated at least partially as a result of at least one mobility characteristic of a plurality of terminal devices.

23. The apparatus of claim 22, wherein the at least one mobility characteristic comprises a speed at which the plurality of terminal devices are moving or being moved.

24. The apparatus of claim 1, wherein the beam-group specific key performance indicators comprise at least one statistic related to handover initiation performed too early or too late.

25. The apparatus of claim 1, wherein the beam-group specific key performance indicators comprise at least one statistic related to ping pong.

26. A method comprising:
associating communication beams into at least two different groups, where at least one of the groups has at least two of the communication beams;
based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams;
wherein the at least one beam-group specific mobility parameter comprises a first cell individual offset and a second cell individual offset;
increasing the first cell individual offset for a first group of beams associated with a first geographical area comprising at least one faster moving user equipment relative to at least one slower moving user equipment of a second geographical area; and
decreasing the second cell individual offset for a second group of beams associated with the second geographical area comprising the at least one slower moving user equipment relative to the at least one faster moving user equipment of the first geographical area; and
transmitting the at least one beam-group specific mobility parameter to a base station;
wherein the at least one beam-group specific mobility parameter is related to handover initiation.

27. The method as claimed in claim 26 where a first one of the groups of communication beams comprises a first plurality of the communication beams and a second one of the groups of communication beams comprises a different second plurality of the communication beams.

28. The method as claimed in claim 26 where the associating comprises at least one of:
use of geographical data,
use of beam resolved information, or
use of a previous beam-group specific key performance indicator.

29. The method as claimed in claim 26 further comprising receiving key performance indicators from the base station which comprise beam-group specific key performance indicators or beam specific key performance indicators.

30. The method as claimed in claim 26 where the method is performed with a network entity.

31. The method as claimed in claim 26 where the beam-group specific key performance indicators are generated based on at least one of:
information from a failure event or a handover event received from a user equipment, or
information from a failure event or a handover event received from a base station.

32. The method as claimed in claim 26 where the method is configured to signal mobility group parameters and group definition to a user equipment or the base station for the user equipment to autonomously select a correct mobility group parameter.

33. The method as claimed in claim 26 where the method comprises receiving beam-group specific key performance indicators from the base station.

34. The method as claimed in claim 26 where the method comprises receiving beam specific key performance indicators, associating the communication beams into the at least two different groups based upon the received beam specific key performance indicators, and sending grouping information to the base station.

35. The method as claimed in claim 34 where the method comprises:
receiving the beam-group specific key performance indicators from the base station, and
at least partially reassigning the association of the communication beams into at least two groups based, at least partially, upon the received beam-group specific key performance indicators.

36. The method as claimed in claim 26 where the method comprises using the beam-group specific key performance indicators to determine at least two different respective beam-group specific mobility parameters for at least two of the groups of communication beams;
and transmitting the at least two beam-group specific mobility parameters to the base station.

37. A non-transitory program storage device readable by a machine, tangibly embodying a program of instructions executable by the machine for performing operations, the operations comprising:

associating communication beams into at least two different groups, where at least one of the groups has at least two of the communication beams;
based upon beam-group specific key performance indicators, where the beam-group specific key performance indicators have been based upon the associating of the communication beams into the at least two different groups, using the beam-group specific key performance indicators to determine at least one beam-group specific mobility parameter for at least one of the groups of communication beams;
wherein the beam-group specific key performance indicators used to determine the at least one beam-group specific mobility parameter comprise statistics related to handover initiation performed too early or too late; and
cause transmitting of the at least one beam-group specific mobility parameter to a base station;
wherein the at least one beam-group specific mobility parameter is related to handover initiation.

\* \* \* \* \*